US009234066B2

(12) United States Patent
Freidank et al.

(10) Patent No.: US 9,234,066 B2
(45) Date of Patent: Jan. 12, 2016

(54) PROCESS FOR PREPARING POLYOL DISPERSIONS

(75) Inventors: Daniel Freidank, Lemfoerde (DE); Andreas Emge, Lemfoerde (DE); Sonja Judat, Ludwigshafen (DE); Robert Engel, Speyer (DE); Ingrid Martin, Lemfoerde (DE); Thomas Danner, Weinheim (DE); Achim Loeffler, Speyer (DE); Stephan Hess, Dossenheim (DE)

(73) Assignee: BASF SE, Ludwigshafen (DE)

( * ) Notice: Subject to any disclaimer, the term of this patent is extended or adjusted under 35 U.S.C. 154(b) by 412 days.

(21) Appl. No.: 12/992,492

(22) PCT Filed: May 11, 2009

(86) PCT No.: PCT/EP2009/055661
§ 371 (c)(1),
(2), (4) Date: Nov. 12, 2010

(87) PCT Pub. No.: WO2009/138379
PCT Pub. Date: Nov. 19, 2009

(65) Prior Publication Data
US 2011/0065840 A1 Mar. 17, 2011

(30) Foreign Application Priority Data
May 13, 2008 (EP) ..................... 08156058

(51) Int. Cl.
C08G 18/00 (2006.01)
C08G 18/08 (2006.01)
C08G 18/28 (2006.01)
C08L 75/00 (2006.01)
B60R 13/00 (2006.01)
C08L 75/04 (2006.01)

(52) U.S. Cl.
CPC ............ *C08G 18/0871* (2013.01); *B60R 13/00* (2013.01); *C08G 18/0876* (2013.01); *C08L 75/04* (2013.01); *Y10T 428/31551* (2015.04); *Y10T 428/31558* (2015.04); *Y10T 428/31591* (2015.04)

(58) Field of Classification Search
CPC C08G 18/0871; C08G 18/0876; C08L 75/04; B60R 13/00; Y10T 428/31551; Y10T 428/31558; Y10T 428/31591
USPC ........................ 524/589, 590, 507; 528/44, 85
See application file for complete search history.

(56) References Cited

U.S. PATENT DOCUMENTS

| 2,630,274 | A | 3/1949 | Smith |
| 4,522,976 | A | 6/1985 | Grace et al. |
| 4,568,705 | A | 2/1986 | Grace et al. |
| 6,753,402 | B1 | 6/2004 | Bauer et al. |
| 7,452,470 | B2 | 11/2008 | Danner et al. |
| 2007/0287757 | A1 | 12/2007 | Kuhnle et al. |
| 2009/0203874 | A1 | 8/2009 | Loffler et al. |
| 2010/0080898 | A1 | 4/2010 | Danner et al. |

FOREIGN PATENT DOCUMENTS

| DE | 197 20 959 | | 11/1998 |
| DE | 197 56 874 | | 6/1999 |
| DE | 198 56 604 | | 6/2000 |
| DE | 10 2007 011 205 | A1 | 9/2008 |
| EP | 0 221 412 | | 5/1987 |
| EP | 0 351 614 | | 1/1990 |
| EP | 0 448 166 | | 9/1991 |
| EP | 1 008 380 | | 6/2000 |
| EP | 1 316 569 | A1 | 6/2003 |
| JP | 09-077966 | A | 3/1997 |
| JP | 2002-308920 | | 10/2002 |
| WO | 01 27185 | | 4/2001 |
| WO | 02 28937 | | 4/2002 |
| WO | 03 076488 | | 9/2003 |

OTHER PUBLICATIONS

U.S. Appl. No. 13/387,540, filed Jan. 27, 2012, Schopohl, et al.
International Search Report issued Nov. 23, 2009 in PCT/EP09/55661 filed May 11, 2009.

*Primary Examiner* — Patrick Niland
(74) *Attorney, Agent, or Firm* — Oblon, McClelland, Maier & Neustadt, L.L.P.

(57) ABSTRACT

The present invention relates to a dispersion comprising
(i) at least one liquid polymer and
(ii) at least one polymer particle mixture comprising at least one meltable solid and at least one copolymer (C), wherein said at least one copolymer (C) is a random copolymer synthesized from at least one α,β-ethylenically unsaturated monomer and at least one polymerizable polymer of the class of liquid polymers according to (i), to processes for preparing this dispersion, to the use of this dispersion to prepare polyurethanes, and to a process for preparing polyurethanes, in which at least one such dispersion is reacted with at least one polyisocyanate.

12 Claims, No Drawings

PROCESS FOR PREPARING POLYOL DISPERSIONS

The present invention relates to a dispersion comprising at least one liquid polymer and at least one polymer particle mixture comprising at least one meltable solid and at least one copolymer (C), wherein said at least one copolymer (C) is a random copolymer synthesized from at least one $\alpha,\beta$-ethylenically unsaturated monomer and at least one polymerizable polymer of the class of liquid polymers, to a process for preparing this dispersion, to the use of this dispersion to prepare polyurethanes, and to a process for preparing polyurethanes, in which at least one such dispersion is reacted with at least one polyisocyanate.

Dispersions with liquid polymers, polyols for example, as a liquid phase are employed for a variety of applications. For example, polyol dispersions are used as base materials for coatings.

Polyol dispersions are frequently employed in polyurethane formulas in order to enhance the mechanical properties, more particularly those of polyurethane foams.

Processes for the preparation of dispersions which comprise polymers as a liquid phase are known in principle from the prior art.

Disclosed in the prior art are what are called graft polyols, which are prepared by free-radical copolymerization of, say, acrylonitrile and styrene in a matrix of conventional polyetherols. This polymerization takes place in the presence of what are called macromers, which are composed of a dispersion-stabilizing polyether chain and of an olefin group which participates in the copolymerization. The dispersion thus prepared is composed of particles having a typical diameter of 1 μm, with a core of polyolefin and with a polyether shell which is compatible with the matrix polyol and prevents agglomeration of the particles.

Graft polyols with small particles and a monomodal particle size distribution can be prepared, for example, by means of semibatch reactions, of the kind described in a series of patents.

EP 0 221 412 A2 discloses graft polymer dispersions in polyoxyalkylene-polyether polyols for the preparation of polyurethane foams. The graft polymers are prepared by free-radical polymerization. U.S. Pat. No. 4,568,705 and U.S. Pat. No. 4,522,976 disclose low-viscosity stable graft polymer dispersions which are likewise prepared by free-radical polymerization in the polyol itself. The use of the graft polymers for preparing polyurethanes is likewise disclosed.

Known from WO 01/27185 is a process for preparing polyether-polyester copolymers by reacting polyester alcohols with alkylene oxides using multimetal cyanide catalysts. Their use for the preparation of polyurethanes is likewise disclosed.

WO 03/076488 as well relates to a process for preparing polyether alcohols using at least one double metal cyanide catalyst. Additionally described are processes for preparing polyurethanes, using the polyether alcohols disclosed therein.

WO 02/28937 A2 discloses a dispersion of a polymer, examples being polyolefins such as polyethylene, polypropylene or polystyrene, in a polyol. In the dispersion it is possible if appropriate for there to be stabilizing compounds, which may be anionic, cationic, nonionic or polymeric. For example, a polyethylene wax functionalized with maleic anhydride, or a reaction product of an ethylene-acrylic acid (EAA) copolymer and a monoamine polyol, is used as a stabilizing compound.

EP 0 448 166 A2 discloses a dispersion comprising at least one polymer obtainable by polymerizing at least one olefinic monomer, this polymer having side chains with at least 10 carbon atoms. In the liquid phase there are surface-active substances, examples being alcohol ethoxy sulfates or lignosulphonates.

A disadvantage of the known dispersions is that there is no disclosure of an emulsifying compound which can be used universally for a series of different thermoplastic polymers for the preparation of a stable dispersion. Furthermore, a costly and inconvenient synthesis of macromers is necessary to start with for the graft polymers proposed, the macromers then being used in the polymerization. The polymerization itself also necessitates a high level of cost and complexity in terms of safety engineering. The necessity to remove unreacted residual monomer after the reaction is likewise disadvantageous.

Furthermore, the preparation of dispersions of this kind is expensive and is not possible for all dispersions which comprise a liquid polymer as a liquid phase.

Starting out from this prior art, it is an object of the present invention to provide dispersions which can be prepared easily and inexpensively. Furthermore, it ought to be possible, with the dispersions that are to be provided, to disperse a series of meltable solids, and for stable dispersions to be obtainable.

A further object on which the invention is based is to provide dispersions, more particularly polyol dispersions, whose properties are readily adaptable.

These objects are achieved in accordance with the invention by means of a dispersion comprising
(i) at least one liquid polymer and
(ii) at least one polymer particle mixture comprising at least one meltable solid and at least one random copolymer (C), wherein said at least one copolymer (C) is a copolymer synthesized from at least one $\alpha,\beta$-ethylenically unsaturated monomer and at least one polymerizable polymer of the class of liquid polymers according to (i).

In the context of the present invention a liquid polymer is a polymer which under standard conditions, i.e., 25° C. and 1013 mbar, is present in the liquid state.

Polymers, block copolymers, and copolymers in the context of the present invention are polymeric compounds which can be characterized by methods for polymers that are known to the skilled worker and which typically have a molecular weight distribution. The structure of the individual molecules may also differ from that of other molecules within the bounds of the distribution that is typical for polymers.

In the context of the present invention a polymer particle mixture is a mixture of polymer particles, all of the polymer particles of the respective polymer particle mixture comprising the same meltable solid and the same copolymer (C), but it being possible, for example, for there to be differences in the proportion of the meltable solid and of the copolymer (C) in the individual polymer particles, or for the particle diameters of the individual polymer particles to differ from one another.

In accordance with the invention the polymer particles preferably have a structure such that the copolymer (C) is disposed in each case at the interface of the polymer particles. Accordingly the copolymer (C) is active, in the context of the present invention, as a surface-active substance in the dispersions of the invention. The meltable solid and the copolymer (C) may be present in cocrystallized form, for example, in the polymer particles.

The dispersions of the invention can be prepared in a simple way. In this context it is more particularly not necessary for a polymerization to be carried out in the liquid polymer, more particularly polyol, which would necessitate separation of monomer. As a result, there is also a broader possibility of variation in combining liquid polymer and meltable solid; in other words, there is no restriction to particular polymers which can be prepared by polymerization in the corresponding liquid polymer. In accordance with the invention the thermoplastic polymer (P) used preferably as a meltable solid may also be a bulk plastic or a recycled product.

The dispersions of the invention allow an inexpensive meltable solid to be introduced into the continuous phase. In this way it is possible to achieve a reduction in costs without detracting from the properties of the support material. Furthermore, the properties of the dispersion can also be adjusted through the choice of the meltable solid, more particularly of the thermoplastic polymer (P).

As a result of the use of meltable solids to increase the solids content, the dispersions of the invention are inexpensive, since a variety of inexpensive materials, including, for example, recycled thermoplastic polymers, can be used. Furthermore, the size distribution of the particles in the dispersion can be adjusted within wide ranges.

Dispersions comprising a liquid polymer as their liquid phase typically have a higher viscosity than aqueous dispersions. Accordingly the meltable solid and the copolymer (C) used must be harmonized with the liquid polymer and with the properties of the liquid polymer.

In the dispersion of the invention there is at least one liquid polymer present as component (i). In one preferred embodiment of the dispersion of the invention the liquid polymer is selected from the group consisting of polyols, polymeric isocyanates, polyacrylates, film-forming polymers, polyurethane prepolymers, polyisobutene, and mixtures thereof, more preferably polyols.

A suitable liquid polymer, more particularly polyol, is, in the context of the present invention, for example, a polymer having a molecular weight (Mw) of greater than 200 g/mol and less than 1 000 000 g/mol, preferably greater than 300 g/mol and less than 50 000 g/mol.

Polymers of this kind may be prepared, for example, from synthetic raw materials or from renewable raw materials, such as fatty alcohols, for example. Suitable polyols may be prepared, for example, via polyaddition or addition polymerization.

In one preferred embodiment of the present invention the at least one polyol is selected from the group consisting of polyetherols, polyesterols, and mixtures thereof.

Suitable in accordance with the invention as polyols are compounds having a hydroxyl group functionality of 2 to 8, preferably 2 to 6, and an average molecular weight of 200 to 20000 g/mol, preferably of 300 to 8000 g/mol, most preferable 300 to 5000 g/mol. The hydroxyl number of the polyhydroxyl compounds is as a general rule 20 to 160 and preferably 28 to 70. The hydroxyl number may be determined, for example, by quantitative conversion of the hydroxy groups with acetic anhydride and titration of the resulting acetic acid by means of KOH.

The average molecular weight can be determined, for example, by means of gel permeation chromatography (GPC). Suitable methods are known in principle to the skilled worker. As standards for the GPC measurements it is possible to use, for example, polystyrene or polymethyl methacrylate more particularly for the measurement of esters.

Also suitable for characterizing the polyols are the viscosity and the iodine number. The viscosity is situated for example in the range from 10 to 100 000 mPas, more particularly in the range from 25 to 50 000 mPas, preferably in the range from 30 to 30 000 mPas, more preferably 40 to 10 000 mPas, and with further preference in the range from 50 to 5000 mPas. More particularly the viscosity in the context of the present invention lies in the range from 100 to 2500 mPas, more preferably in the range from 200 to 1000 mPas.

The iodine number of the polyols is situated, in the context of the present invention, at, for example, <10 g iodine/100 g polymer, more particularly <5 g iodine/100 g polymer, preferably <2.5 g iodine/100 g polymer, more preferably <2.0 g iodine/100 g polymer.

Polyols suitable in accordance with the invention can be prepared, for example, by alkoxylation with propylene oxide and ethylene oxide using starter molecules with amine or hydroxyl groups. Examples of suitable compounds are described in WO 03/076488.

Polyols suitable in accordance with the invention are, for example, polyether polyols based on propylene glycol, propylene oxide and ethylene oxide, polyether polyols based on glycerol, propylene oxide, and ethylene oxide, polyether polyols based on glycerol, propylene oxide, and ethylene oxide, polyether polyols based on glycerol, propylene oxide, and ethylene oxide, polyether polyols based on trimethylolpropane, propylene oxide, or polyether polyols based on toluenediamine, propylene oxide, and ethylene oxide.

Accordingly the present invention, in another embodiment, also provides a polyol dispersion as described above, the at least one polyol being selected from the group consisting of polyetherols and polyesterols.

According to the present invention, graft- and polymer polyols with particles having a size being different to the particle size, which is adjusted by the dispersion process, are suitable as liquid polymers.

In accordance with the invention the dispersion, or the polyol dispersion, may also comprise two or more liquid polymers.

The polyol dispersions of the invention may comprise one or more polyols. The polyols may differ, for example, in OH number, in chemical structure, in functionality or in the primary OH group content. It is likewise possible in the context of the present invention for the dispersion or polyol dispersion of the invention to comprise one or more different particle mixtures or polymer particle mixtures.

Present in the dispersion of the invention as component (ii) is at least one polymer particle mixture comprising at least one meltable solid and at least one copolymer (C).

In a further embodiment the dispersion of the invention may, in addition to the copolymer (C), comprise at least one copolymer (C'), specified later on below. The preferred embodiments specified there apply accordingly.

In one preferred embodiment of the dispersion of the invention the at least one meltable solid is selected from the group consisting of sulfur, urea, phosphorus, preferably red phosphorus, thermoplastic polymers (P), and mixtures thereof. With particular preference the at least one meltable solid is a thermoplastic polymer (P).

In accordance with the invention it is possible to use all thermoplastic polymers (P) in the polyol dispersion of the invention, provided suitable copolymers (C) are present. In accordance with the invention it is also possible to use mixtures of different thermoplastic polymers (P).

Thermoplastic polymers (P) suitable in accordance with the invention typically have an average molecular weight of 1000 to 5 000 000 g/mol, preferably 1000 to 100 000 g/mol, more preferably 2000 to 20 000 g/mol. The molecular weights in the context of the present invention are typically determined by means of GPC, generally with utilization of polystyrene standards.

Thermoplastic polymers (P) suitable in accordance with the invention typically have a melting temperature or softening temperature which lies above the service temperature. Thermoplastic polymers (P) suitable in accordance with the invention typically have a melting temperature of greater than 25° C., more particularly of greater than 60° C., more preferably of greater than 80° C. The melting temperature is typically determined by means of DSC.

Thermoplastic polymers (P) suitable in accordance with the invention can be prepared by all of the typical polymerization processes known to the skilled worker. Suitable processes are, for example, free-radical or anionic polymerization processes.

In one preferred embodiment the at least one thermoplastic polymer (P) is selected from the group consisting of polystyrene, substituted polystyrene, alkyl-substituted polystyrene for example, poly(styrene-co-acrylonitrile), polyacrylate, polymethacrylate, polyolefins, such as polyethylene, polypropylene, polybutadiene, polyvinyl chloride, polyacrylonitrile, polyesters, polyethylene terephthalate for example, polyamides, nylon for example, polyethers which are solid at room temperature, such as high molecular weight polyethylene glycol or high molecular weight polytetramethylene oxide, copolymers comprising at least one of the monomers present in the aforementioned polymers, examples being copolymers of styrene and acrylates, styrene and acrylonitrile or styrene and ethylene, and mixtures thereof.

More particular preference as thermoplastic polymer (P) is given to polystyrene and to other polyolefins, polyesters, and polyamides.

It is preferred in accordance with the invention to use as a thermoplastic polymer (P) recycled materials, i.e., polymers which come from a recycling operation. Recycled polymers of this kind may be polyethylene or else polyethylene terephthalate, for example.

Accordingly the present invention, in one further embodiment, also provides a dispersion as described above in which the at least one meltable solid is polyethylene or recycled polyethylene terephthalate.

The advantage resides here primarily in the low price of the meltable solid or recycled plastic, which in this way can be used in a high-value application.

The copolymer (C) present in the dispersion of the invention acts in the dispersion of the invention as an emulsifier, permitting complete and stable dispersion of the at least one meltable solid in the at least one liquid polymer. For this purpose it is necessary, in accordance with the invention, for the at least one copolymer (C) to have at least one block which is compatible with the at least one meltable solid, and a block which is compatible with the at least one liquid polymer.

In accordance with the invention, copolymers used as copolymers (C) are synthesized from at least one α,β-ethylenically unsaturated monomer and at least one unsaturated polymerizable polymer of the class of liquid polymers according to (i).

In one preferred embodiment the at least one α,β-ethylenically unsaturated monomer is of the general formula (I)

in which
R$^1$ is C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl, substituted or unsubstituted C$_5$-C$_{30}$-heteroaryl or functional group selected from —(C═O)—O—R$^3$ or —(C═O)—NH—R$^4$, with R$^3$ and R$^4$ selected from H, C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl, substituted or unsubstituted C$_5$-C$_{30}$-heteroaryl and R$^2$ is H, C$_1$-C$_{30}$-alkyl, C$_2$-C$_{30}$-alkenyl, C$_2$-C$_{30}$-alkynyl, C$_1$-C$_{30}$-heteroalkyl, substituted or unsubstituted C$_5$-C$_{30}$-aryl or substituted or unsubstituted C$_5$-C$_{30}$-heteroaryl.

Preferably in the general formula (I)
R$^1$ is substituted or unsubstituted C$_5$-C$_{30}$-aryl, such as benzyl or naphthyl, for example, substituted or unsubstituted C$_5$-C$_{30}$-heteroaryl or functional group selected from —(C═O)—O—R$^3$ or —(C═O)—NH—R$^4$ with R$^3$ and R$^4$ selected from C$_1$-C$_{30}$-alkyl, more particularly C$_{12}$-C$_{30}$-alkyl, or C$_2$-C$_{30}$-alkenyl, more particularly C$_{12}$-C$_{30}$-alkenyl, and R$^2$ is H, C$_1$-C$_{12}$-alkyl, such as methyl, ethyl, propyl or butyl, for example.

Heteroatoms are selected for example from N, O, P, and S.

In one especially preferred embodiment the α,β-ethylenically unsaturated monomer is selected from the group consisting of styrene, α-methylstyrene, acrylonitrile, acrylates, acrylic esters or methacrylic esters or acrylamides or methacrylamides of saturated fatty alcohols or amines, examples being derivatives of lauric acid C$_{11}$H$_{23}$COOH, tridecanoic acid C$_{12}$H$_{25}$COOH, myristic acid C$_{13}$H$_{27}$COOH, pentadecanoic acid C$_{14}$H$_{29}$COOH, palmitic acid C$_{15}$H$_{31}$COOH, margaric acid C$_{16}$H$_{33}$COOH, stearic acid C$_{17}$H$_{35}$COOH, nonadecanoic acid C$_{18}$H$_{37}$COOH, arachidic acid C$_{19}$H$_{39}$COOH, behenic acid C$_{21}$H$_{43}$COOH, ligniceric acid C$_{23}$H$_{47}$COOH, cerotinic acid C$_{25}$H$_{51}$COOH, melissic acid C$_{29}$H$_{59}$COOH, tuberculostearic acid i-C$_{18}$H$_{37}$COOH, or unsaturated fatty alcohols or amines, examples being derivatives of palmitoleic acid C$_{15}$H$_{29}$COOH, oleic acid C$_{17}$H$_{33}$COOH, erucic acid C$_{21}$H$_{41}$COOH, linoleic acid C$_{17}$H$_{31}$COOH, linolenic acid C$_{17}$H$_{29}$COOH, elaeostearic acid C$_{17}$H$_{29}$COOH, arachidonic acid C$_{19}$H$_{31}$COOH, clupanodonic acid C$_{21}$H$_{33}$COOH, docosahexaenoic acid C$_{21}$H$_{31}$COOH, and mixtures thereof.

In one preferred embodiment there are one or two, preferably two different, unsaturated monomers of the general formula (I) in the at least one copolymer (C).

According to the present invention, copolymers (C) are obtained from at least one α,β-ethylenically unsaturated monomer, as described above, and at least one polymerizable polymer of the class of liquid polymers according to (i).

The class of liquid polymers according to (i) is described above. In a preferred embodiment, the liquid polymer is selected from the group consisting of polyols, polymeric isocyanates, polyacrylates, film forming polymers, polyurethane-prepolymers, polyisobutene and mixtures thereof, particularly preferred polyols.

To obtain that the mentioned polymers according to (i) are polymerizable with at least one α,β-unsaturated monomer, in order to obtain copolymers (C), they have to comprise at least one C—C-double bonding. In a preferred embodiment of the present invention, these C—C-double bondings are introduced into the liquid polymers of group (i) in a separate reaction.

For example, polyols being copolymerizable with α,β-unsaturated monomers can be obtained by using unsaturated starting alcohols in the preparation of polyols, for example isoprenol, allylalcohol, hydroxybutylvinyl ether, hydroxyalkyl(meth)acrylates, like for example hydroxyethylacrylate, hydroxyisopropylacrylate, hydroxyethylmeth-acrylate, hydroxyisopropylmethacrylate, hydroxybutylacrylate. Suitable copolymerizable polyols can be obtained by reaction of polyols with unsaturated acids or esters, for example (meth)acrylic acid, (meth)acrylic acid esters or isocyanates.

Polymeric isocyanates, being copolymerizable with α,β-unsaturated monomers can for example be prepared by reaction of NCO-terminate polymeric isocyanates with hydroxyalkylacrylates or -methacrylates.

Polyurethane prepolymers being copolymerizable with α,β-unsaturated monomers can for example be obtained by reaction of NCO-terminated polyurethane prepolymers with hydroxyalkyl acrylates or methacrylates.

Poly(meth)acrylates being copolymerizable with α,β-unsaturated monomers can for example be obtained by reaction of poly(meth)acrylates with unsaturated alcohols, for example allylalcohols, isoprenol, hydroxybutylvinylether or by transesterification of further hydroxyalkyl(meth)acrylates.

Polyisobutene being copolymerizable with α,β-unsaturated monomers can for example be obtained by reaction of PIBSA (polyisobutene-succinic acid-anhydride) with unsaturated alcohols, for example allylalcohol, isoprenol, hydroxybutylvinylether, or further hydroxyalkyl(meth)acrylates, in order to obtain the corresponding esters (ring opening).

According to the above-mentioned, the at least one polymerizable polymer of the class of liquid polymers according to (i) is in a preferred embodiment selected from the group consisting of polyols, which are based on an unsaturated starter alcohol, or which are obtained by reaction of polyols with unsaturated acids or esters or isocyanates, polymeric isocyanates, which are obtained by reaction of NCO-terminated polymeric isocyanates with hydroxylalkylacrylates or -methacrylates, polyurethane-prepolymers, which are obtained by reaction of NCO-terminated polyurethane-prepolymers with hydroxyalkylacrylates or -methacrylates, poly(meth)acrylates, which are obtained by reaction of poly(meth)acrylates with unsaturated alcohols, polyisobutene, which is obtained by reaction of PIBSA (polyisobutene-succinic acid-anhydride) with unsaturated alcohols, and mixtures thereof.

In one preferred embodiment the at least one polymerizable polymer of the class of liquid polymers according to (i) present in the copolymer (C) is particularly preferably an unsaturated polyetherpolyol, i.e. an unsaturated polyaddition product of at least one polyhydric alcohol, examples being sugars, glycerol, trimethylolpropane, or a polyfunctional amine, an example being toluenediamine, at least one alkylene oxide, such as ethylene oxide, propylene oxide, butylene oxide and/or pentylene oxide, for example, and at least one unsaturated monomer, examples being styrene or α-methyl-styrene substituted with at least one isocyanate group, more particularly meta-isopropenylbenzyl isocyanate, examples being acrylic acid, acryloyl chloride, methacrylic acid, methacryloyl chloride, fumaric acid, maleic anhydride, vinylically unsaturated epoxides such as, for example, acryloyl glycidyl ether, methacryloyl glycidyl ether, for example.

Examples of especially preferred copolymers (C) are copolymers of butyl acrylate, styrene, an unsaturated polyether polyol from sorbitol, propylene oxide, ethylene oxide, and meta-isopropenylbenzyl isocyanate (mass ratio 1:1:1), copolymers of butyl acrylate, styrene, an unsaturated polyether polyol from sorbitol, propylene oxide, ethylene oxide, and meta-isopropenylbenzyl isocyanate (mass ratio 1:2:1), copolymers of butyl acrylate, styrene, an unsaturated polyether polyol from sorbitol, propylene oxide, ethylene oxide, and meta-isopropenylbenzyl isocyanate (mass ratio 2:2:1), copolymers of butyl acrylate, styrene, an unsaturated polyether polyol from sorbitol, propylene oxide, ethylene oxide, and meta-isopropenylbenzyl isocyanate (mass ratio 4:4:1), copolymers of butyl acrylate, styrene, an unsaturated polyether polyol from sorbitol, propylene oxide, ethylene oxide, and meta-isopropenylbenzyl isocyanate (mass ratio 4:4:1), copolymers of butyl acrylate, styrene, an unsaturated polyether polyol from sorbitol, propylene oxide, ethylene oxide, and meta-isopropenylbenzyl isocyanate (mass ratio 4:4:1) with relatively low molecular weight, copolymers of styrene, an unsaturated polyether polyol from sorbitol, propylene oxide, ethylene oxide, and meta-isopropenylbenzyl isocyanate (mass ratio 8:1), copolymers of butyl acrylate, styrene, an unsaturated polyether polyol from sorbitol, propylene oxide, ethylene oxide, and meta-isopropenylbenzyl isocyanate (mass ratio 8:8:1) with relatively low molecular weight, copolymers of styrene, stearyl acrylate, an unsaturated polyether polyol from sorbitol, propylene oxide, ethylene oxide, and meta-isopropenylbenzyl isocyanate (mass ratio 1:1:1), copolymers of stearyl acrylate, an unsaturated polyether polyol from sorbitol, propylene oxide, ethylene oxide, and meta-isopropenylbenzyl isocyanate (mass ratio 1:1:1), copolymers of butyl acrylate, stearyl acrylate, an unsaturated polyether polyol from sorbitol, propylene oxide, ethylene oxide, and meta-isopropenylbenzyl isocyanate (mass ratio 1:1:1), copolymers of stearyl acrylate, hydroxyethyl acrylate, an unsaturated polyether polyol from hydroxyethyl acrylate, diisocyanate, and polyether polyol, copolymers of stearyl acrylate, hydroxypropyl acrylate, an unsaturated polyether polyol from hydroxyethyl acrylate, diisocyanate, and polyether polyol, copolymers of stearyl acrylate, styrene, and an unsaturated polyether polyol from hydroxyethyl acrylate, diisocyanate, and polyether polyol, copolymers of stearyl acrylate, acrylonitrile and an unsaturated polyether polyol from hydroxyethyl acrylate, diisocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, an unsaturated polyether polyol from hydroxyethyl acrylate, diisocyanate, and polyether polyol, copolymers of unsaturated fatty alcohol ($C_{12}$-$C_{30}$) of fatty alcohol ($C_{12}$-$C_{30}$) and meta-isopropenylbenzyl isocyanate, styrene, an unsaturated polyether polyol from hydroxyethyl acrylate, diisocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, acrylonitrile, an unsaturated polyether polyol from hydroxyethyl acrylate, diisocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, an unsaturated polyether polyol from meta-isopropenylbenzyl isocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, styrene, an unsaturated polyether polyol from meta-isopropenylbenzyl isocyanate, and polyether polyol.

These polymers suitable in accordance with the invention as copolymers (C) preferably have a molecular weight in the range from 1000 to 10 000 000 g/mol, more particularly from 5000 to 5 000 000, more particularly from 10 000 to 2 000 000 g/mol. Typically the molecular weights are determined by means of GPC.

The fraction of the copolymers (C) is typically 0.1% to 20%, preferably 0.2% to 10%, more particularly 0.5% to 5%, by weight, based on the total weight of the meltable solid used.

In one preferred embodiment there is additionally or instead of the copolymer at least one emulsifier in the dispersion of the invention.

A characteristic of the emulsifiers used in accordance with the invention is that at least part of the molecule has an affinity for the disperse phase, in other words for the meltable solid, and at least part has an affinity for the continuous phase, in other words for the liquid polymer.

Suitable in accordance with the invention are all of the emulsifiers that are known to the skilled worker, and mixtures of two or more emulsifiers can also be used.

Examples of suitable emulsifiers in the context of the present invention include sulfonic acid derivatives, examples being sodium salts of a naphthalenesulfonic acid-formaldehyde condensation product with about 1-2% of sodium sulfate, or sodium salts of a naphthalenesulfonic acid-formaldehyde condensation product with about 3-8% of sodium sulfate;

propylene oxide-ethylene oxide copolymers, examples being propylene oxide-ethylene oxide copolymers with 10% ethylene oxide (EO) and a molecular weight (Mw) of about 1000 g/mol, propylene oxide-ethylene oxide copolymers with 10% EO and a molecular weight (Mw) of about 2000 g/mol, propylene oxide-ethylene oxide copolymers with 40% EO and a molecular weight (Mw) of about 2900 g/mol, propylene oxide-ethylene oxide copolymers with 80% EO and a molecular weight (Mw) of about 8000 g/mol, propylene oxide-ethylene oxide copolymers with 10% EO and a molecular weight (Mw) of about 2600 g/mol, propylene oxide-ethylene oxide copolymers with 40% EC) and a molecular weight (Mw) of about 4600 g/mol, propylene oxide-ethylene oxide copolymers with 10% EO and a molecular weight (Mw) of about 3500 g/mol, propylene oxide-ethylene oxide copolymers with 50% EO and a molecular weight (Mw) of about 6500 g/mol, propylene oxide-ethylene oxide copolymers with 20% EO and a molecular weight (Mw) of about 2150 g/mol, propylene oxide-ethylene oxide copolymers with 35% EO and a molecular weight (Mw) of about 4100 g/mol, propylene oxide-ethylene oxide copolymers with 20% EO and a molecular weight (Mw) of about 3100 g/mol, propylene oxide-ethylene oxide copolymers with 10% EO and a molecular weight (Mw) of about 3500 g/mol;

alkoxylated fatty alcohols, alkoxylated glycerol, oleic acid ethoxylates, ethoxylated fatty alcohols, an example being ethoxylated castor oil, ethoxylated $C_{16}C_{18}$ fatty alcohols with 11 EO units, ethoxylated $C_{16}C_{18}$ fatty alcohols with 25 EO units, ethoxylated $C_{16}C_{18}$ fatty alcohols with 50 EO units, ethoxylated $C_{16}C_{18}$ fatty alcohols with 80 EO units, ethoxylated $C_{13}C_{15}$ oxo alcohols with 5 EO units, ethoxylated $C_{13}C_{15}$ oxo alcohols with 8 EO units, ethoxylated $C_{13}C_{15}$ oxo alcohols with 30 EO units, ethoxylated $C_{13}$ oxo alcohols with 5 EO units, ethoxylated $C_{13}$ oxo alcohols with 8 EO units, ethoxylated $C_{13}$ oxo alcohols with 12 EO units, ethoxylated $C_{13}$ oxo alcohols with 20 EO units, ethoxylated $C_{13}$ oxo alcohols with 30 EO units, ethoxylated $C_{13}$ oxo alcohols with 40 EO units, ethoxylated tridecanol N with 15 EO units, ethoxylated tridecanol N with 22 EO units, ethoxylated oleamides with 10 EO units, ethoxylated oleylamines with 12 EO units, end-capped alkoxylated fatty alcohols, mixtures of glycerol monooleate and propylene glycol, mixtures of the partial esters of stearic acid and palmitic acid with ethoxylated glycerol, more particularly with 20 EO units per glycerol, triglycerol monooleate, decaglycerol tetraoleate;

esters of dodecanoic acid and polyethylene glycol 200, esters of dodecanoic acid and polyethylene glycol 400, esters of tall oil fatty acid and polyethylene glycol 400, monoesters of dodecanoic acid and polyethylene glycol 400, monoesters of oleic acid and polyethylene glycol 400, monoesters of tall oil fatty acid and polyethylene glycol 400, esters of tall oil fatty acid and polyethylene glycol 600, esters of dodecanoic acid and polyethylene glycol 600, esters of stearic acid and polyethylene glycol 600, monoesters of stearic acid and polyethylene glycol 600, esters of stearic acid and polyethylene glycol 6000, diesters of polyoxyalkylene glycol and oleic acid, esters of lauryl sulfate, stearyl sulfate, and polyethylene glycol;

sorbitol derivatives, examples being sorbitol monooleates, sorbitol monostearates, sorbitol tristearates, sorbitol trioleates, sorbitol monotallates, ethoxylated sorbitol monolaurates, ethoxylated sorbitol monooctadecanoates, ethoxylated sorbitol trisoctadecanoates, polysorbitols, polysorbitol monooleates, polysorbitol trisoctadecanoates, polysorbitol monotallates; polyglycerol behenates, silicone polyetherols;

polycarbonate polyols, an example being a polycarbonate polyol obtainable from a polyether polyol formed from trimethylolpropane and ethylene oxide, octadecenol, and diethyl carbonate in a ratio of (0.75:0.25):1 with a molecular weight Mw of about 5400 g/mol, a polycarbonate polyol, obtainable from a polyether polyol formed from trimethylolpropane and ethylene oxide, octadecenol, and diethyl carbonate in a ratio of (0.5:0.5):1, with a molecular weight Mn: 1200, Mw: 2800 g/mol, a polycarbonate polyol obtainable from a polyether polyol formed from trimethylolpropane and ethylene oxide, dodecanol, and diethyl carbonate in a ratio of (0.9:0.1:1), with a molecular weight Mn: 5400, Mw: 38600 g/mol, a polycarbonate polyol obtainable from a polyether polyol formed from trimethylolpropane and ethylene oxide, octadecanol, and dimethyl carbonate in a ratio of (0.7:0.3:1), with a molecular weight Mn: 1940, Mw: 40000 g/mol, a polycarbonate polyol obtainable from a polyether polyol formed from trimethylolpropane and ethylene oxide, diethyl carbonate, and Lutensol TO3 in a ratio of (1.0:0.8:0.2), with a molecular weight Mn: 1340, Mw: 4850 g/mol, a polycarbonate polyol obtainable from a polyether polyol formed from trimethylolpropane and ethylene oxide, diethyl carbonate, oleyl alcohol in a ratio of (1.0:0.8:0.2), with a molecular weight Mn: 1650, Mw: 6100 g/mol, a polycarbonate polyol obtainable from a polyether polyol formed from trimethylolpropane and ethylene oxide, diethyl carbonate, and oleyl alcohol in a ratio of (1.0:0.8:0.2), with a molecular weight Mn: 1970, Mw: 12400 g/mol, a polycarbonate polyol obtainable from a polyether polyol formed from trimethylolpropane and ethylene oxide, diethyl carbonate, and oleyl alcohol in a ratio of (1.0:0.67:0.17), with a molecular weight Mn: 2440, Mw: 21600 g/mol, a polycarbonate polyol obtainable from a polyether polyol formed from trimethylpropane and propylene oxide, diethylcarbonate, and oleyl alcohol in a ratio of (1.0:0.9:0.1), with a molecular weight Mn: 920, Mw: 1950 g/mol, a polycarbonate polyol obtainable from a polyether polyol formed from trimethylpropane and propylene oxide, diethyl carbonate, and oleyl alcohol in a ratio of (1.2:0.8:0.2), with a molecular weight Mn: 1610, Mw: 4300 g/mol, a polycarbonate polyol obtainable from a polyether polyol formed from trimethylpropane and propylene oxide, diethyl carbonate, and an ethoxylated alkyl-oxo alcohol in a ratio of (1.0: 0.8:0.2), with a molecular weight Mn: 1420, Mw: 4830 g/mol, a polycarbonate polyol obtainable from Lupranol 1301, diethyl carbonate, and oleyl alcohol (1.0:0.8:0.2), with a molecular weight Mn: 1650, Mw: 7200 g/mol, a polycarbonate polyol obtainable from a polyether polyol formed from trimethylolpropane and propylene oxide, diethyl carbonate, and oleyl alcohol (1.0:0.7:0.3), with a molecular weight Mn: 1060, Mw: 7370 g/mol, a polycarbonate polyol obtainable from a polyether polyol formed from trimethylpropane and propylene oxide, diethyl carbonate, and oleyl alcohol (1.0:0.6:0.4), with a molecular weight Mn: 610, Mw: 2870 g/mol, a polycarbonate polyol obtainable from Lupranol 1301, diethyl carbonate, and oleyl alcohol (1.0:0.85:0.15), with a molecular weight Mn: 510, Mw: 3850 g/mol, a polycarbonate polyol obtainable from a polyether polyol formed from trimethylpropane and propylene oxide, diethyl carbonate, and oleyl alcohol (1.0:0.85:0.15), with a molecular weight Mn: 3650, Mw: 15100 g/mol, a polycarbonate polyol obtainable from a polyether polyol formed from trimethylpropane and propylene oxide, diethyl carbonate, and oleyl alcohol (1.0:0.6:0.4), with a molecular weight Mn: 1100, Mw: 7300 g/mol, a polycarbonate polyol obtainable from a polyether polyol formed from trimethylpropane and propylene oxide, diethyl carbonate, and stearyl isocyanate (100% conversion), a polycarbonate polyol obtainable from a polyether polyol formed from trimethylpropane and propylene oxide, diethyl carbonate, stearyl isocyanate (30% conversion);

esters, examples being esters of polyether polyol formed from trimethylolpropane and ethylene oxide and polyisobutenesuccinic anhydride, esters of polyisobutenesuccinic anhydride, polyetherol formed from glycerol, propylene oxide, and ethylene oxide, esters of polyisobutenesuccinic anhydride, polyetherol from toluylenediamine, propylene oxide, and ethylene oxide, isocyanate prepolymers, examples being isocyanate prepolymers comprising toluylene diisocyanate, polyether polyol formed from trimethylolpropane and ethylene oxide, oleylamine.

Suitable emulsifiers are available for example under the following trade names: Tamol® NN 2901, Tamol® NN 8906, Pluronic® PE 3100, Pluronic® PE 6100, Pluronic® PE 6400, Pluronic® PE 6800, Pluronic® PE 8100, Pluronic® PE 9400, Pluronic® PE10100, Pluronic® PE 10500, Pluronic® RPE 1720, Pluronic® RPE 2035, Pluronic® RPE 2520, Pluronic® RPE 3110, Degressal® SD 20, Degressal® SD 21, Degressal® SD 22, Degressal® SD 23, Degressal® SD 61, Emulan® A, Emulan® OG, Emulan® ELP, Emulan® EL, Emulan® ELH 60, Lutensol® AT 11, Lutensol® AT 25, Lutensol® AT 50, Lutensol® AT 80, Lutensol® AO 5, Lutensol® AO 8, Lutensol® AO 30, Lutensol® TO 5, Lutensol® TO 8, Lutensol® TO 12, Lutensol® TO 20, Lutensol® TO 30, Lutensol® TO 40, Lutensol® FSA 10, Lutensol® FA 12, Plurafac® LF 120, Plurafac® LF 131, Plurafac® LF 132, Plurafac® LF 223, Plurafac® LF 224, Plurafac® LF 226, Plurafac® LF 231, Plurafac® LF 303, Plurafac® LF 400, Plurafac® LF 401, Plurafac® LF 403, Plurafac® LF 407, Plurafac® LF 431, Plurafac® LF 500, Plurafac® LF 600, Plurafac® LF 711, Plurafac® LF 1300, Plurafac® LF1430, Mazol® 159, Mazol® 300K, Mazol® 80 MGK, Mazol® GMOK, Mazol® GMSK, Mazol® PGO 31K, Mazol® PGO 104K, Mazol® GMSD K, Mapeg® 200 ML, Mapeg® 400 DO, Mapeg® 400 DOT, Mapeg® 400 ML, Mapeg® 400 MO, Mapeg® 400 MOT, Mapeg® 600 DOT, Mapeg® 600 DO, Mapeg® 600 DS, Mapeg® 600 MS, Mapeg® 6000 DS, Mapeg® L61 Dioleate, Mapeg® S40 K, S-Maz® 20, S-Maz® 60, S-Maz® 65, S-Maz® 80, S-Maz® 85, S-Maz® 90, T-Maz® 20, T-Maz® 21, T-Maz® 28, T-Maz® 60, T-Maz® 65, T-Maz® 80, T-Maz®81, T-Maz® 85, T-Maz® 90, PGB®, DABCO® DC5103, DABCO® DC193, Niax Silicon, Tegostab B8423, Tegostab B8433, TDNx15EO, TDNx22EO.

The fraction of the optionally present emulsifier is in the context of the present invention typically 0.1% to 20%, preferably 0.2% to 10%, more particularly 0.5% to 5%, by weight, based on the total weight of the meltable solid used.

Where, optionally, a mixture of two or more emulsifiers is used, the sum of the emulsifiers in the context of the present invention is preferably 0.1% to 20%, preferably 0.2% to 10%, more particularly 0.5% to 5%, by weight, based on the total weight of the meltable solid used.

The required amount of the emulsifier and/or of the copolymer is dependent on the desired average particle diameter of the polymer particle mixture, the desired amount of solids and on the molecular weight of the emulsifier and/or copolymer (C) used. The greater the desired particle diameter or the smaller the derived amount of solids is, the less the amount of emulsifier and/or copolymer used in accordance with the invention.

For example, the dispersion of the invention comprises the meltable solid in an amount of 2.0% to 70.0% by weight, preferably of 5.0% to 60.0% by weight, more preferably of 15.0% to 45.0% by weight, based in each case on the overall dispersion. The dispersion of the invention typically comprises the at least one copolymer (C) in an amount of 0.1% to 20.0% by weight, preferably of 1.0-10.0% by weight, more preferably of 2.0% to 7.5% by weight, based in each case on the overall dispersion. The dispersion of the invention further comprises the at least one liquid polymer, more particularly the at least one polyol, in an amount of 15.0% to 94.9% by weight, more particularly of 30.0% to 88.0% by weight, with particular preference of 47.5% to 83.0% by weight, based in each case on the overall dispersion.

The overall solids content of the polyol dispersions of the invention can vary within wide ranges, being for example from 1% to 80% by weight. The polyol dispersions of the invention have for example an overall solids content of 5% to 65%, advantageously of 10% to 50%, by weight.

In the context of the present invention the solids content of the dispersions is to be understood as the percentage ratio of the polymer particle mixture to the liquid polymer employed. The solids content may be determined by gravimetry, for example, from the percentage ratio of the mass of solids to the overall mass of the dispersion.

Accordingly in one further embodiment the present invention also provides a dispersion as described above, the dispersion having a solids content of 5% to 65% by weight. In accordance with the invention the particles present in the dispersion of the invention have a maximum diameter Dmax of less than 100 μm, preferably of less than 20 μm, more particularly less than 10 μm, as determined by means of dynamic light scattering, Fraunhofer diffraction and/or laser diffractometry in accordance with the method disclosed in WO 03/078496.

In accordance with the invention the particle mixture or polymer particle mixture present in the dispersion or polyol dispersion preferably has an average particle diameter of 0.01 to 20.0 μm. With particular preference the average particle diameter is 0.05 to 10.0 μm, more particularly 0.1 to 5.0 μm, very preferably 0.5 to 3.0 μm, and, for example, 0.7 to 2.0 μm.

In accordance with the invention the particle size distribution may be monomodal, bimodal or multimodal.

In accordance with the invention the dispersion may comprise further solids or other additives, provided the solids content is situated within the ranges specified above.

In accordance with the invention it is also possible for the polyol dispersion further to comprise a graft polyol. This polyol may be added, for example, to a polyol dispersion of the invention.

The present invention also provides a process (V) for preparing a dispersion of the invention, comprising the steps of (A) heating a mixture (I) comprising at least one meltable solid, at least one liquid polymer, and at least one copolymer (C), said at least one copolymer (C) being a random copolymer synthesized from at least one $\alpha,\beta$-ethylenically unsaturated monomer and at least one polymerizable polymer of the class of liquid polymers according to (i), to give a mixture (II), and (C) cooling the mixture (II).

The process of the invention allows the economic preparation of dispersions, more particularly polyol dispersions, in a simple way. With regard to the liquid polymers, preferably the polyols, the copolymers (C), the meltable solids, more particularly the thermoplastic polymers (P), the amounts of the individual components, and the preferred embodiments, the comments relating to the dispersions of the invention apply. In addition it is also possible to use the stated emulsifiers and/or copolymers (C').

Preferably in step (A) of the process of the invention the mixture (I) is heated to a temperature at which the meltable solid used, preferably the thermoplastic polymer (P), melts and is not decomposed. Preferably the other components used are not decomposed at the temperature chosen.

In accordance with the invention, when the composition is heated in step (A), the meltable solid is melted. When this occurs, in accordance with the invention, an emulsion is formed, the at least one copolymer (C) and, if appropriate, at least one additional emulsifier being disposed preferably predominantly at the interface of meltable solid and polyol. In the context of the present invention, mixture (II) is preferably an emulsion.

The temperature for step (A) lies in general at least 10° C., preferably at least 30° C., and more preferably at least 50° C. above the melting point of the meltable solid used and/or above the melting- or softening point of the thermoplastic polymer (P) used.

When the mixture (II) is cooled, in accordance with the invention, the droplets solidify or crystallize, and a particle mixture is formed which comprises at least one meltable solid, at least one copolymer (C), and, if appropriate, an additional emulsifier.

In accordance with the invention, in step (A), in addition to the heating of the mixture (I), there is a mixing process, and so the at least one meltable solid is present in melted state in the mixture (I), preferably in the form of finely divided drops.

The incorporation of the at least one meltable solid in accordance with the invention takes place preferably at relatively high temperatures as a result of intensive mixing, preferably by stirring, with addition of the at least one copolymer (C) and, if appropriate, of an additional emulsifier. The initial product is preferably an emulsion of melted droplets in the liquid polymer. The drop size may be controlled through the stirring energy introduced and through the added nature and amount of the copolymer (C) and/or of the emulsifier.

As a result of cooling of the emulsion, the drops solidify, and the regions of the at least one copolymer (C) that are compatible with the at least one meltable solid accumulate at the interface of meltable solid and liquid polymer and are thereby able to bring about stabilization of the resulting dispersion.

In accordance with the invention it is possible for the composition comprising the at least one meltable solid and the at least one liquid polymer to be heated beyond the melting point or melting range of the meltable solid. This operating step may take place, for example, in a stirred tank. It is also possible to subject the at least one meltable solid, which is present initially as a solid, to separate melting for example in an extruder, kneader or any other suitable apparatus and then to bring it together with the at least one liquid polymer, with the aid for example of pumps. In both cases, not only the continuous phase but also the disperse phase may be admixed with the auxiliaries that are necessary accordingly for formulation and subsequent use, such as surfactants or further emulsifiers. It is also possible in accordance with the invention to carry out these operations in pressure apparatus, since the vapor pressure of the continuous phase may rise as a result of the increasing temperature, and may also be situated above the ambient pressure. As soon as the continuous phase and the disperse phase comprising the melted solid have been united with one another, the composition is also referred to in the context of the present invention as a crude emulsion.

The crude emulsion can then be treated in an emulsifying apparatus, the drops being finely comminuted (a process referred to as fine emulsification). The operating step of fine emulsification may be carried out discontinuously, in a stirred vessel for example, or continuously. Continuously operating machines and apparatus for the emulsification are known to the skilled worker and are, for example, colloid mills, toothed ring dispersing machines and other designs of dynamic mixers, and also high-pressure homogenizers, pumps with downstream nozzles, valves, membranes or other narrow gap geometries, static mixers, micromixing systems, and ultrasonic emulsifying systems. Preference is given to using toothed ring dispersing machines or high-pressure homogenizers.

Following fine emulsification, the fine emulsion may be cooled below the melting point or melting range of the meltable solid. In this case the solid solidifies in the disperse phase in a particulate form. During or after fine emulsification, the formulation may be admixed with further optional auxiliaries, such as surfactants, further emulsifiers or protective colloids.

Before, during or after the process of the invention for preparing the dispersions it is possible optionally to add further formulating assistants. The term formulating assistants describes surfactants, antifoams, thickeners, further emulsifiers, and protective colloids. In the case of the polyol dispersions intended for polyurethane applications, it is additionally possible to add antioxidants or stabilizers.

Suitable methods of melt emulsification are described for example in Schultz S., Wagner G., Urban K., Ulrich J., Chem. Eng. Technol. 2004, 27, No. 4, 361-368, "High-pressure homogenization as a process for emulsion formation", in Urban K., Wagner G., Schaffner D., Röglin D., Ulrich J., Chem. Eng. Technol. 2006, 29, No. 1, 24-31, "Rotor-stator and disc systems for emulsification processes", and in EP 1 008 380 B1.

In accordance with the invention, step (A) or step (C) or step (A) and step (C) of the process of the invention are carried out with stirring.

In a preferred embodiment of the process according to the present invention, in step (C) no shearing strain is present. According to the present invention, "no shearing strain" means that no energy addition is conducted, which may change the stability of the dispersion, i.e., no addition of energy is conducted, wherein an additional dispersion, additional coalescence or additional agglomeration of the dispersed meltable solid can be acquired.

Accordingly the present invention, in accordance with a further embodiment, also provides a process as described above for preparing a dispersion, in which step (A) of the process is carried out with stirring.

In this case, in accordance with the invention, the temperature in step (A) must be above the melting temperature of the at least one meltable solid, more particularly of the thermoplastic polymer (P).

In accordance with the invention it is also possible for the heating as per step (A) to be carried out in an extruder, preferably in a twin-screw extruder.

For individual applications it may be advantageous if the particles have a narrow particle diameter distribution. More particularly it may be advantageous for the dispersion not to contain any large particles, i.e., particles having a diameter of greater than 10 μm, which can lead to disruptions in processing, such as to the clogging of filters, screens or nozzles, for example. Therefore the dispersion obtained in accordance with the process of the invention is purified by a single-stage or multistage filtration after the cooling as per step (C), according to one embodiment.

In a preferred embodiment, the process according to the present invention comprises after step (A) and prior to step (C) the following step (B):

(B) Dispersion of mixture (II).

Processes, in order to disperse the mixture (II) according to the present application are known to the skilled artisan, for example rotor-stator-systems, for example explained in U.S. Pat. No. 2,630,274 A, DE 19720959 A1 or Urban K. et al., Chem. Eng. Technology, 2006, 29, Number 1, pages 24 to 31 or ultrasonic emulsion, for example explained in DE 19756874 A1, or membrane emulsion, for example explained in U.S. Pat. No. 7,452,470 B2, or high pressure systems for example explained in DE 19856604 A1, DE 10207011205 A1 or Schultz, S. et al., Chem. Eng. Technol. 2004, 27, Number 4, pages 361 to 368.

Therefore, the present invention relates in a preferred embodiment to the process according to the present invention, wherein it comprises after step (A) and prior to step (C) the following step (B):

(B) dispersion of mixture (II).

Suitable liquid polymers for the process of the invention are the above-mentioned polymers, particularly the aforementioned polyols. Consequently, according to one further embodiment, the present invention also provides a process as described above for preparing a polyol dispersion, in which the at least one polyol is selected from the group consisting of polyetherols, polyesterols, and mixtures thereof.

Suitable meltable solids for the process of the invention are more particularly the aforementioned thermoplastic polymers (P). Consequently, according to one further embodiment, the present invention also provides a process as described above for preparing a dispersion, more particularly a polyol dispersion, in which the at least one thermoplastic polymer (P) is selected from the group consisting of polystyrene, polyethylene, and polyethylene terephthalate.

In accordance with the invention, copolymer (C) and meltable solid, more particularly thermoplastic polymer (P), are used in amounts which correspond to the desired proportion in the particle mixture.

Consequently, according to one further embodiment, the present invention also provides a process as described above for preparing a dispersion, more particularly a polyol dispersion, in which the at least one copolymer (C) is used in an amount of 0.1% to 10% by weight, based on the total weight of the at least one meltable solid used, more particularly of the thermoplastic polymer (P).

The present invention further provides, in addition, a process (V') for preparing a dispersion, comprising the steps of:

(A') heating a mixture (I') comprising at least one meltable solid, at least one liquid polymer, and at least one copolymer (C') and/or an emulsifier, to give a mixture (II'), (B) dispersing of mixture (II') and (C) cooling the mixture (II') with a cooling rate of at least 10 K/min.

Step (A') of this process (V') of the invention corresponds in principle to step (A) of the first-mentioned process (V) of the invention, with the difference that the mixture (I'), in addition to at least one liquid polymer and at least one meltable solid, comprises at least one copolymer (C') and/or an emulsifier. With regard to the meltable solids and the liquid polymers, the comments made above apply.

Suitable emulsifiers in the context of the present invention are, for example, commercially available emulsifiers, more particularly alkoxylated fatty alcohols.

Examples of suitable emulsifiers in the context of the present invention include sulfonic acid derivatives, examples being sodium salts of a naphthalenesulfonic acid-formaldehyde condensation product with about 1-2% of sodium sulfate, or sodium salts of a naphthalenesulfonic acid-formaldehyde condensation product with about 3-8% of sodium sulfate;

propylene oxide-ethylene oxide copolymers, examples being propylene oxide-ethylene oxide copolymers with 10% ethylene oxide (EO) and a molecular weight (Mw) of about 1000 g/mol, propylene oxide-ethylene oxide copolymers with 10% EO and a molecular weight (Mw) of about 2000 g/mol, propylene oxide-ethylene oxide copolymers with 40% EO and a molecular weight (Mw) of about 2900 g/mol, propylene oxide-ethylene oxide copolymers with 80% EO and a molecular weight (Mw) of about 8000 g/mol, propylene oxide-ethylene oxide copolymers with 10% EO and a molecular weight (Mw) of about 2600 g/mol, propylene oxide-ethylene oxide copolymers with 40% EO and a molecular weight (Mw) of about 4600 g/mol, propylene oxide-ethylene oxide copolymers with 10% EO and a molecular weight (Mw) of about 3500 g/mol, propylene oxide-ethylene oxide copolymers with 50% EO and a molecular weight (Mw) of about 6500 g/mol, propylene oxide-ethylene oxide copolymers with 20% EO and a molecular weight (Mw) of about 2150 g/mol, propylene oxide-ethylene oxide copolymers with 35% EO and a molecular weight (Mw) of about 4100 g/mol, propylene oxide-ethylene oxide copolymers with 20% EO and a molecular weight (Mw) of about 3100 g/mol, propylene oxide-ethylene oxide copolymers with 10% EO and a molecular weight (Mw) of about 3500 g/mol;

alkoxylated fatty alcohols, alkoxylated glycerol, oleic acid ethoxylates, ethoxylated fatty alcohols, an example being ethoxylated castor oil, ethoxylated $C_{16}C_{18}$ fatty alcohols with 11 EO units, ethoxylated $C_{16}C_{18}$ fatty alcohols with 25 EO units, ethoxylated $C_{16}C_{18}$ fatty alcohols with 50 EO units, ethoxylated $C_{16}C_{18}$ fatty alcohols with 80 EO units, ethoxylated $C_{13}C_{15}$ oxo alcohols with 5 EO units, ethoxylated $C_{13}C_{15}$ oxo alcohols with 8 EO units, ethoxylated $C_{13}C_{15}$ oxo alcohols with 30 EO units, ethoxylated $C_{13}$ oxo alcohols with 5 EO units, ethoxylated $C_{13}$ oxo alcohols with 8 EO units, ethoxylated $C_{13}$ oxo alcohols with 12 EO units, ethoxylated $C_{13}$ oxo alcohols with 20 EO units, ethoxylated $C_{13}$ oxo alcohols with 30 EO units, ethoxylated $C_{13}$ oxo alcohols with 40 EO units, ethoxylated tridecanol N with 15 EO units, ethoxylated tridecanol N with 22 EO units, ethoxylated oleamides with 10 EO units, ethoxylated oleylamines with 12 EO units, end-capped alkoxylated fatty alcohols, mixtures of glycerol monooleate and propylene glycol, mixtures of the partial esters of stearic acid and palmitic acid with ethoxylated glycerol, more particularly with 20 EO units per glycerol, triglycerol monooleate, decaglycerol tetraoleate;

esters of dodecanoic acid and polyethylene glycol 200, esters of dodecanoic acid and polyethylene glycol 400, esters of tall oil fatty acid and polyethylene glycol 400, monoesters of dodecanoic acid and polyethylene glycol 400, monoesters of oleic acid and polyethylene glycol 400, monoesters of tall oil fatty acid and polyethylene glycol 400, esters of tall oil fatty acid and polyethylene glycol 600, esters of dodecanoic acid and polyethylene glycol 600, esters of stearic acid and polyethylene glycol 600, monoesters of stearic acid and polyethylene glycol 600, esters of stearic acid and polyethylene glycol 6000, diesters of polyoxyalkylene glycol and oleic acid, esters of lauryl sulfate, stearyl sulfate, and polyethylene glycol;

sorbitol derivatives, examples being sorbitol monooleates, sorbitol monostearates, sorbitol tristearates, sorbitol trioleates, sorbitol monotallates, ethoxylated sorbitol monolaurates, ethoxylated sorbitol monooctadecanoates, ethoxylated sorbitol trisoctadecanoates, polysorbitols, polysorbitol monooleates, polysorbitol trisoctadecanoates, polysorbitol monotallates;

polyglycerol behenates, silicone polyetherols;

polycarbonate polyols, an example being a polycarbonate polyol obtainable from a polyether polyol formed from trimethylolpropane and ethylene oxide, octadecenol, and diethyl carbonate in a ratio of (0.75:0.25):1 with a molecular weight Mw of about 5400 g/mol, a polycarbonate polyol, obtainable from a polyether polyol formed from trimethylolpropane and ethylene oxide, octadecenol, and diethyl carbonate in a ratio of (0.5:0.5):1, with a molecular weight Mn: 1200, Mw: 2800 g/mol, a polycarbonate polyol obtainable from a polyether polyol formed from trimethylolpropane and ethylene oxide, dodecanol, and diethyl carbonate in a ratio of (0.9:0.1:1), with a molecular weight Mn: 5400, Mw: 38600 g/mol, a polycarbonate polyol obtainable from a polyether polyol formed from trimethylolpropane and ethylene oxide, octadecanol, and dimethyl carbonate in a ratio of (0.7:0.3:1), with a molecular weight Mn: 1940, Mw: 40000 g/mol, a polycarbonate polyol obtainable from a polyether polyol formed from trimethylolpropane and ethylene oxide, diethyl carbonate, and Lutensol TO3 in a ratio of (1.0:0.8:0.2), with a molecular weight Mn: 1340, Mw: 4850 g/mol, a polycarbonate polyol obtainable from a polyether polyol formed from trimethylolpropane and ethylene oxide, diethyl carbonate, oleyl alcohol in a ratio of (1.0:0.8:0.2), with a molecular weight Mn: 1650, Mw: 6100 g/mol, a polycarbonate polyol obtainable from a polyether polyol formed from trimethylolpropane and ethylene oxide, diethyl carbonate, and oleyl alcohol in a ratio of (1.0:0.8:0.2), with a molecular weight Mn: 1970, Mw: 12400 g/mol, a polycarbonate polyol obtainable from a polyether polyol formed from trimethylolpropane and ethylene oxide, diethyl carbonate, and oleyl alcohol in a ratio of (1.0:0.67:0.17), with a molecular weight Mn: 2440, Mw: 21600 g/mol, a polycarbonate polyol obtainable from a polyether polyol formed from trimethylpropane and propylene oxide, diethylcarbonate, and oleyl alcohol in a ratio of (1.0:0.9:0.1), with a molecular weight Mn: 920, Mw: 1950 g/mol, a polycarbonate polyol obtainable from a polyether polyol formed from trimethylpropane and propylene oxide, diethyl carbonate, and oleyl alcohol in a ratio of (1.2:0.8:0.2), with a molecular weight Mn: 1610, Mw: 4300 g/mol, a polycarbonate polyol obtainable from a polyether polyol formed from trimethylpropane and propylene oxide, diethyl carbonate, and an ethoxylated alkyl-oxo alcohol in a ratio of (1.0: 0.8:0.2), with a molecular weight Mn: 1420, Mw: 4830 g/mol, a polycarbonate polyol obtainable from Lupranol 1301, diethyl carbonate, and oleyl alcohol (1.0:0.8:0.2), with a molecular weight Mn: 1650, Mw: 7200 g/mol, a polycarbonate polyol obtainable from a polyether polyol formed from trimethylpropane and propylene oxide, diethyl carbonate, and oleyl alcohol (1.0:0.7:0.3), with a molecular weight Mn: 1060, Mw: 7370 g/mol, a polycarbonate polyol obtainable from a polyether polyol formed from trimethylpropane and propylene oxide, diethyl carbonate, and oleyl alcohol (1.0:0.6:0.4), with a molecular weight Mn: 610, Mw: 2870 g/mol, a polycarbonate polyol obtainable from Lupranol 1301, diethyl carbonate, and oleyl alcohol (1.0:0.85:0.15), with a molecular weight Mn: 510, Mw: 3850 g/mol, a polycarbonate polyol obtainable from a polyether polyol formed from trimethylpropane and propylene oxide, diethyl carbonate, and oleyl alcohol (1.0:0.85:0.15), with a molecular weight Mn: 3650, Mw: 15100 g/mol, a polycarbonate polyol obtainable from a polyether polyol formed from trimethylpropane and propylene oxide, diethyl carbonate, and oleyl alcohol (1.0:0.6:0.4), with a molecular weight Mn: 1100, Mw: 7300 g/mol, a polycarbonate polyol obtainable from a polyether polyol formed from trimethylpropane and propylene oxide, diethyl carbonate, and stearyl isocyanate (100% conversion), a polycarbonate polyol obtainable from a polyether polyol formed from trimethylpropane and propylene oxide, diethyl carbonate, stearyl isocyanate (30% conversion);

esters, examples being esters of polyether polyol formed from trimethylolpropane and ethylene oxide and polyisobutenesuccinic anhydride, esters of polyisobutenesuccinic anhydride, polyetherol formed from glycerol, propylene oxide, and ethylene oxide, esters of polyisobutenesuccinic anhydride, polyetherol from toluylenediamine, proplene oxide, and ethylene oxide, isocyanate prepolymers, examples being isocyanate prepolymers comprising toluylene diisocyanate, polyether polyol formed from trimethylolpropane and ethylene oxide, oleylamine.

Examples of suitable copolymers (C') include the following:

Copolymers of butyl acrylate, styrene, an unsaturated polyether polyol from sorbitol, propylene oxide, ethylene oxide, and meta-isopropenylbenzyl isocyanate (mass ratio 1:1:1), copolymers of butyl acrylate, styrene, an unsaturated polyether polyol from sorbitol, propylene oxide, ethylene oxide, and meta-isopropenylbenzyl isocyanate (mass ration 1:2:1), copolymers of butyl acrylate, styrene, an unsaturated polyether polyol from sorbitol, propylene oxide, ethylene oxide, and meta-isopropenylbenzyl isocyanate (mass ratio 2:2:1), copolymers of butyl acrylate, styrene, an unsaturated polyether polyol from sorbitol, propylene oxide, ethylene oxide, and meta-isopropenylbenzyl isocyanate (mass ratio 4:4:1), copolymers of butyl acrylate, styrene, an unsaturated polyether polyol from sorbitol, propylene oxide, ethylene oxide, and meta-isopropenylbenzyl isocyanate (mass ratio 4:4:1), copolymers of butyl acrylate, styrene, an unsaturated polyether polyol from sorbitol, propylene oxide, ethylene oxide, and meta-isopropenylbenzyl isocyanate (mass ratio (4:4:1) with relatively low molecular weight, copolymers of styrene, an unsaturated polyether polyol from sorbitol, propylene oxide, ethylene oxide, and meta-isopropenylbenzyl isocyanate (mass ratio 8:1), copolymers of butyl acrylate, styrene, an unsaturated polyether polyol from sorbitol, propylene oxide, ethylene oxide, and meta-isopropenylbenzyl isocyanate (mass ratio 8:8:1) with relatively low molecular weight, copolymers of styrene, stearyl acrylate, an unsaturated polyether polyol from sorbitol, propylene oxide, ethylene oxide, and meta-isopropenylbenzyl isocyanate (mass ratio 1:1:1), copolymers of stearyl acrylate, an unsaturated polyether polyol from sorbitol, propylene oxide, ethylene oxide, and meta-isopropenylbenzyl isocyanate (mass ratio 1:1:1), copolymers of butyl acrylate, stearyl acrylat, an unsaturated polyether polyol from sorbitol, propylene oxide, ethylene oxide, and meta-isopropenylbenzyl isocyanate (mass ratio 1:1:1), copolymers of stearyl acrylate, hydroxyethyl acrylate, an unsaturated polyether polyol from hydroxyethyl acrylate, diisocyanate, and polyether polyol, copolymers of stearyl acrylate, hydroxypropyl acrylate, an unsaturated polyether polyol from hydroxyethyl acrylate, diisocyanate, and polyether polyol, copolymers of stearyl acrylate, styrene, and an unsaturated polyether polyol from hydroxyethyl acrylate, diisocyanate, and polyether polyol, copolymers of stearyl acrylate, acrylonitrile and an unsaturated polyether polyol from hydroxyethyl acrylate, diisocyanate, and polyether polyol, copolymers of unsaturated fatty alcohol ($C_{12}$-$C_{30}$) from fatty alcohol ($C_{17}$-$C_{30}$) and meta-isopropenylbenzyl isocyanate, and unsaturated polyether polyol from hydroxyethyl acrylate, diisocyanate, and polyether polyol, copolymers of unsaturated fatty alcohol ($C_{12}$-$C_{30}$) of fatty alcohol ($C_{12}$-$C_{30}$) and meta-isopropenylbenzyl isocyanate, styrene, an unsaturated polyether polyol from hydroxyethyl acrylate, diisocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, acrylonitrile, an unsaturated polyether polyol from hydroxyethyl acrylate, diisocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, an unsaturated polyether polyol from meta-isopropenylbenzyl isocyanate, and polyether polyol, copolymers of unsaturated fatty alcohol ($C_{12}$-$C_{30}$) from fatty alcohol ($C_{12}$-$C_{30}$) and meta-isopropenylbenzyl isocyanate, styrene, an unsaturated polyether polyol from meta-isopropenylbenzyl isocyanate, and polyether polyol.

Further suitable copolymers (C') are copolymers which have at least one block compatible with the thermoplastic polymer (P), and at least one block compatible with the polyol.

In accordance with the invention the copolymer (C') may also comprise further blocks. The length of the individual blocks may be different.

Typically the length of the individual blocks is 5 to 60 repeat units, for example, 10 to 40 repeat units, preferably 15 to 20 repeat units.

Suitable in accordance with the invention as copolymer (C') are, for example, polyester-polyether copolymers, polyamide-polyether copolymers, polystyrene-polyether copolymers or polyethylene-polyether copolymers. In accordance with the invention it is possible to use diblock or triblock copolymers.

Polyether-polyester copolymers or polyether-polyamide copolymers may be prepared, for example, by alkoxidation of short-chain polyesters or polyamides by means of double metal cyanide catalyst.

As alkylene oxide it is possible for example to use ethylene oxide, propylene oxide, butylene oxide, 1,2-isobutylene oxide, and also any desired mixtures thereof with one another.

Used with preference are ethylene oxide, propylene oxide, and mixtures thereof. The alkylene oxides may be used individually or, when using two or more different alkylene oxides, in any desired mixing ratio. Furthermore, the mixing ratio of the alkylene oxides may be varied both continuously and discontinuously during the synthesis.

The required short-chain polyesters with hydroxy end groups are available commercially in large numbers and are used as what are called polyesterols likewise in polyurethane systems.

The copolymer (C') may be prepared by all of the typical processes known to the skilled worker. Suitable processes are described in, for example, "Anionic synthesis of well-defined, poly[(styrene)-block-(propylene oxide) block copolymers"; R. P. Quirk, G. M. Lizarraga; Macrom. Chem. a. Phys., 2001, 1395-1404.

The synthesis of polyester-polyether copolymers is described in, for example, WO 01/27185 or WO 03/76488, whose relevant content is incorporated by reference.

Polyester-polyether copolymers can also be prepared, for example, via a condensation reaction of relatively long-chain polyethylene glycols together with difunctional acids such as terephthalic acid or adipic acid, for example, and other diols such as monoethylene glycol, diethylene glycol or 1,4-butanediol, for example.

One possibility for the synthesis of polystyrene-polyether copolymers is, for example, the living anionic polymerization of styrene and alkylene oxides. As alkylene oxides it is possible more particularly to use those identified above, more preferably ethylene oxide or propylene oxide and also mixtures thereof.

Copolymers suitable in accordance with the invention preferably have a molecular weight in the range from 3000 to 30 000 g/mol, more particularly from 6000 to 15 000 g/mol. The molecular weights are typically determined by means of GPC.

Suitable emulsifiers/copolymers (C') are available for example under the following trade names: Tamol® NN 2901, Tamol® NN 8906, Pluronic® PE 3100, Pluronic® PE 6100, Pluronic® PE 6400, Pluronic® PE 6800, Pluronic® PE 8100, Pluronic® PE 9400, Pluronic® PE10100, Pluronic® PE 10500, Pluronic® RPE 1720, Pluronic® RPE 2035, Pluronic® RPE 2520, Pluronic® RPE 3110, Degressal® SD 20, Degressal® SD 21, Degressal® SD 22, Degressal® SD 23, Degressal® SD 61, Emulan® A, Emulan® OG, Emulan® ELP, Emulan® EL, Emulan® ELH 60, Lutensol® AT 11, Lutensol® AT 25, Lutensol® AT 50, Lutensol® AT 80, Lutensol® AO 5, Lutensol® AO 8, Lutensol® AO 30, Lutensol® TO 5, Lutensol® TO 8, Lutensol® TO 12, Lutensol® TO 20, Lutensol® TO 30, Lutensol® TO 40, Lutensol® FSA 10, Lutensol® FA 12, Plurafac® LF 120, Plurafac® LF 131, Plurafac® LF 132, Plurafac® LF 223, Plurafac® LF 224, Plurafac® LF 226, Plurafac® LF 231, Plurafac® LF 303, Plurafac® LF 400, Plurafac® LF 401, Plurafac® LF 403, Plurafac® LF 407, Plurafac® LF 431, Plurafac® LF 500, Plurafac® LF 600, Plurafac® LF 711, Plurafac® LF 1300, Plurafac® LF1430, Mazol® 159, Mazol® 300K, Mazol® 80 MGK, Mazol® GMOK, Mazol® GMSK, Mazol® PGO 31K, Mazol® PGO 104K, Mazol® GMSD K, Mapeg® 200 ML, Mapeg® 400 DO, Mapeg® 400 DOT, Mapeg® 400 ML, Mapeg® 400 MO, Mapeg® 400 MOT, Mapeg® 600 DOT, Mapeg® 600 DO, Mapeg® 600 DS, Mapeg® 600 MS, Mapeg® 6000 DS, Mapeg® L61 Dioleate, Mapeg® S40 K, S-Maz® 20, S-Maz® 60, S-Maz® 65, S-Maz® 80, S-Maz® 85, S-Maz® 90, T-Maz® 20, T-Maz® 21, T-Maz® 28, T-Maz® 60, T-Maz® 65, T-Maz® 80, T-Maz® 81, T-Maz0 85, T-Maz® 90, PGB®, DABCO® DC5103, DABCO® DC193, Niax Silicon, Tegostab 88423, Tegostab B8433, TDNx15EO, TDNx22EO.

In accordance with the invention it is also possible to use two or more of the stated emulsifiers/copolymers (C').

The fraction of the emulsifier/copolymer (C') in the context of the process (V') in accordance with the present invention is typically 0.1% to 20%, preferably 0.2% to 10%, more particularly 0.5% to 3%, by weight, based on the overall weight of the meltable solid used.

Where a mixture of two or more emulsifiers/copolymers (C') is used, the sum of the emulsifiers, in the context of the process (V') according to the present invention, is preferably 0.1% to 20%, preferably 0.2% to 10%, more particularly 0.5% to 5%, by weight, based on the overall weight of the meltable solid used.

The amount of the emulsifier or copolymer (C') required is dependent on the desired average particle diameter of the particle mixture or polymer particle mixture and on the molecular weight of the emulsifier or copolymer (C') employed. The larger the desired particle diameter, the less emulsifier or copolymer is used in accordance with the invention.

In step (C) of the process (V') of the invention, the mixture (II') obtained in step (A') is cooled with a cooling rate of at least 10 K/min, preferably at least 20 K/min, more preferably 60 K/min.

In step (C) of the process (V') of the invention, the mixture (II') obtained in step (A') is cooled with a cooling rate of not more than 2000 K/min, preferably not more than 1000 K/min, more preferably not more than 500 K/min.

The inventively very high cooling rates in step (C) of the process (V') may be achieved through apparatus known to the skilled worker, as for example by means of the following heat exchangers (HE) for cooling: double-tube HE, plate HE, tube bundle HE, U-tube HE (special version of the tube bundle), spiral HE, direct cooling by introduction of evaporating coolant, immiscible cooling medium, cold continuous phase, direct cooling by guiding of the product stream through "cold tunnels", such as introduction of the product into a cool medium, such as a gas, for example, application to belt coolers, in the form for example of a thin film, application to roll coolers, in the form for example of a thin film, and combinations of these embodiments.

As a result of the very rapid cooling in step (C) of the process (V') of the invention it is possible to obtain a stable and very homogeneously dispersed polyol dispersion. Accordingly it is possible as a result of the process (V') of the invention for the cooling to take place without the introduction of shear forces into the mixture (II').

In one preferred embodiment of the process (V') of the invention there is no shearing in step (C).

The dispersion that is present after step (C) can be worked up by the methods stated in relation to process (V), as for example by filtration.

On the basis of the process for their preparation, the dispersions or polyol dispersions prepared by the processes (V) and (V') are notable for the use of inexpensive, commercialized emulsifiers, and the prevention of coalescence and agglomeration. Accordingly the present invention also provides dispersions, preferably polyol dispersions, preparable by processes (V) and (V') of the invention.

The dispersions or polyol dispersions of the invention, and the dispersions obtainable by the process of the invention, are suitable for a variety of applications. Depending on the field of application, the dispersions or polyol dispersions of the invention may comprise further auxiliaries and additives.

The dispersions or polyol dispersions of the invention, and/or the dispersions obtainable by the process of the invention, can be used, for example, as base materials for coatings for the automobile industry, as reactive diluents or crosslinkers for example. Particularly suitable for applications of this kind are dispersions which comprise polymeric isocyanates as liquid polymer.

The dispersions or polyol dispersions of the invention are additionally suitable as base materials for dispersions for architectural coatings, sealants, cement, paper, textile, leather, and base materials for adhesives. Particularly suitable for applications of this kind are dispersions which comprise polyacrylates, film-forming polymers or polyurethane prepolymers as liquid polymer.

The dispersions or polyol dispersions of the invention are suitable, furthermore, as fuel additives or roof coatings. Particularly suitable for applications of this kind are dispersions which comprise polyisobutene as liquid polymer.

The polyol dispersions of the invention, and the polyol dispersions obtainable by a process of the invention, are suitable more particularly for the preparation of polyurethanes.

The present invention therefore also provides for the use of a polyol dispersion as described above or of a polyol dispersion obtainable by a process as described above to prepare polyurethanes.

Through the use of the polyol dispersions of the invention in the preparation of polyurethanes, more particularly of polyurethane foams, it is possible to exert a positive influence over the foaming behavior, more particularly the cell-opening behavior. Owing to the dispersed phase, i.e., the solids in the polyol dispersion, there is an increase in hardness of the polyurethane foams in comparison to foams produced without the addition of the polyol dispersions of the invention.

Methods and ingredients for the production of polyurethanes are known in principle to the skilled worker. Typically at least one polyol component and at least one polyisocyanate are reacted.

The present invention consequently also provides a process for preparing a polyurethane, in which at least one polyol dispersion as described above or a polyol dispersion obtainable by a process as described above is reacted with at least one polyisocyanate.

The preparation of the polyurethanes takes place in accordance with the invention more particularly through reaction of organic and/or modified organic polyisocyanates with the above-described polyol dispersions of the invention and, if appropriate, further compounds containing hydrogen atoms that are reactive toward isocyanates, in the presence of catalysts, if appropriate, water and/or other blowing agents, and, if appropriate, further auxiliaries and additives.

In accordance with the invention the polyol dispersion of the invention or the polyol dispersion obtainable by a process of the invention can be used alone or together with at least one further polyol or together with at least one graft polyol or together with at least one further polyol and at least one graft polyol.

As regards the further starting components which can be used in addition to the polyol dispersions of the invention, the following details may be given:

As polyisocyanates, it is in principle possible, according to the invention, to use all polyisocyanates known to those skilled in the art, in particular aliphatic, cycloaliphatic, araliphatic and preferably aromatic polyfunctional isocyanates.

Examples of suitable polyisocyanates are: alkylene diisocyanates having from 4 to 12 carbon atoms in the alkylene radical, e.g. dodecane 1,12-diisocyanate, 2-ethyl-tetramethylene 1,4-diisocyanate, 2-methyl pentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanato-methylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates.

The organic diisocyanates and polyisocyanates can be used individually or in the form of their mixtures.

Preference is given to using tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI. Particular preference is given to using mixtures of diphenylmethane diisocyanate isomers having proportions of diphenylmethane 2,4'-diisocyanate of at least 30% by weight.

Use is frequently also made of modified polyfunctional isocyanates, i. e. products which are obtained by chemical reaction of organic diisocyanates and/or polyisocyanates. Examples which may be mentioned are diisocyanates and/or polyisocyanates comprising ester, urea, biuret, allophanate, carbodiimide, isocyanurate, uretdione and/or urethane groups. Specific examples are: organic, preferably aromatic, polyisocyanates comprising urethane groups and having NCO contents of from 43 to 15% by weight, preferably from 31 to 21% by weight, based on the total weight, diphenylmethane 4,4'-diisocyanate modified by reaction with, for example, low molecular weight diols, triols, dialkylene glycols, trialkylene glycols or polyoxyalkylene glycols having mean molecular weights of up to 6000 g/mol, in particular mean molecular weights up to 1500 g/mol, modified diphenylmethane 4,4'-diisocyanate, modified diphenylmethane 4,4'- and 2,4'-diisocyanate mixtures or modified crude MDI or tolylene 2,4- or 2,6-diisocyanate. The dialkylene glycols or polyoxyalkylene glycols can be used individually or as mixtures; examples are: diethylene glycol, dipropylene glycol, polyoxyethylene, polyoxypropylene and polyoxypropylene-polyoxyethene glycols, triols and/or tetrols. Also suitable are prepolymers which comprise NCO groups and have NCO contents of from 25 to 35% by weight, preferably from 21 to 14% by weight, based on the total weight, and are prepared from polyester polyols and/or preferably polyether polyols and diphenylmethane 4,4'-diisocyanate, mixtures of diphenylmethane 2,4'- and 4,4'-diisocyanate, tolylene 2,4- and/or 2,6-diisocyanates or crude MDI. Further suitable polyisocyanates are liquid polyisocyanates comprising carbodiimide groups and/or isocyanurate rings and having NCO contents of from 43 to 15% by weight, preferably from 31 to 21% by weight, based on the total weight, e.g. ones based on diphenylmethane 4,4'-, 2,4'- and/or 2,2'-diisocyanate and/or tolylene 2,4- and/or 2,6-diisocyanate.

The modified polyisocyanates can, according to the invention, also be mixed with one another or with unmodified organic polyisocyanates such as diphenylmethane 2,4'-, 4,4'-diisocyanate, crude MDI, tolylene 2,4- and/or 2,6-diisocyanate.

Particularly useful modified organic polyisocyanates are prepolymers which comprise NCO groups and are advantageously formed by reaction of the isocyanates with polyols and, if appropriate, further compounds having functional groups which are reactive toward isocyanates.

Apart from the above-described polyol dispersions of the invention, further compounds having hydrogen atoms which are reactive toward isocyanates may be added if appropriate.

Possible compounds here are, for example, compounds having at least two reactive hydrogen atoms. It is advantageous to use ones having a functionality of from 2 to 8, preferably from 2 to 3, and a mean molecular weight of from 300 to 8000, preferably from 300 to 5000. The hydroxyl number of the polyhydroxyl compounds is generally from 20 to 160 and preferably from 28 to 70.

The polyhydroxy compounds used according to the invention, for example polyether polyols, are prepared by known methods. For example, they can be prepared by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule having from 2 to 8, preferably from 2 to 3, reactive hydrogen atoms or by cationic polymerization using Lewis acids such as antimony pentachloride, boron fluoride etherate, etc., or bleaching earth as catalysts. Polyhydroxy compounds can likewise be prepared from one or more alkylene oxides having from 2 to 4 carbon atoms in the alkylene radical by means of double metal cyanide catalysis. For specific applications, monofunctional starters can also be incorporated into the polyether structure.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Possible starter molecules are, for example: water, organic dicarboxylic acids such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylene-diamine, 1,3- or 1,4-butylenediamine, 1,2-, 1,3-, 1,4-, 1,5- and 1,6-hexamethylene-diamine, phenylenediamine, 2,3-, 2,4- and 2,6-toluenediamine and 4,4'-, 2,4'- and 2,2'-diaminodiphenylmethane. Further possible starter molecules are: alkanolamines such as ethanolamine, N-methylethanolamine and N-ethylethanolamine, dialkanolamines such as diethanolamine, N-methyldiethanolamine and N-ethyldiethanolamine, trialkanolamines such as triethanolamine, and ammonia. Preference is given to using polyhydric, in particular dihydric and/or trihydric, alcohols such as ethanediol, 1,2- and 2,3-propanediol, diethylene glycol, dipropylene glycol, 1,4-butanediol, 1,6-hexanediol, glycerol, trimethylolpropane, pentaerythritol.

The polyether polyols, preferably polyoxypropylene polyols and polyoxypropylene-polyoxyethylene polyols, have a functionality of preferably from 2 to 8 and in particular from 2 to 3 and mean molecular weights of from 300 to 8000 g/mol, preferably from 300 to 6000 g/mol and in particular from 1000 to 5000 g/mol. Suitable polyoxytetramethylene glycols have, for example, a mean molecular weight up to about 3500 g/mol.

The polyhydroxy compounds, in particular polyether polyols, can be used individually or in the form of mixtures.

Apart from the polyether polyols described, it is also possible to use, for example, polyether polyamines and/or further polyols selected from the group consisting of polyester polyols, polythioether polyols, polyesteramides, hydroxyl-comprising polyacetals and hydroxyl-comprising aliphatic polycarbonates or mixtures of at least two of the polyols mentioned.

The hydroxyl number of the polyhydroxyl compounds is generally from 20 to 80 and preferably from 28 to 70.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms, by customary methods. The organic polycarboxylic acids and/or derivatives thereof and polyhydric alcohols are usually polycondensed, advantageously in a molar ratio of from 1:1 to 1:1.8, preferably from 1:1.05 to 1:1.2, in the absence of catalysts or preferably in the presence of esterification catalysts, advantageously in an atmosphere of inert gas such as nitrogen, carbon monoxide, helium, argon, etc., in the melt at temperatures of from 150 to 250° C., preferably from 180 to 220° C., if appropriate under reduced pressure, to the desired acid number which is advantageously less than 10, preferably less than 2.

Possible hydroxyl-comprising polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals. Possible polycarbonates having hydroxyl groups are those of the type known per se, which can be prepared, for example, by reaction of diols such as 1,3-propanediol, 1,4-butanediol and/or 1,6-hexanediol, diethylene glycol, triethylene glycol or tetraethylene glycol with diaryl carbonates, e.g. diphenyl carbonate, or phosgene. Polyesteramides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines. Suitable polyetherpolyamines can be prepared from the abovementioned polyether polyols by known methods. Examples which may be mentioned are the cyanoalkylation of polyoxyalkylene polyols and subsequent hydrogenation of the nitrile formed or the partial or complete amination of polyoxyalkylene polyols with amines or ammonia in the presence of hydrogen and catalysts.

The polyhydroxy compounds can be used individually or in the form of mixtures.

The polyurethanes can, according to the invention, be produced without or with concomitant use of chain extenders and/or crosslinkers.

As chain extenders and/or crosslinkers, it is possible to use diols and/or triols having molecular weights of less than 400 g/mol, preferably from 60 to 300 g/mol. Examples are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, triethanolamine, diethanolamine, glycerol and trimethylolpropane and low molecular weight hydroxyl-comprising polyalkylene oxides based on ethylene and/or 1,2-propylene oxide and the abovementioned diols and/or triols as starter molecules.

If chain extenders, crosslinkers or mixtures thereof employed for the production according to the invention of polyurethanes, they are advantageously used in an amount up to 10% by weight, based on the weight of the sum of the polyol compounds.

As blowing agents, it is possible to use the chlorofluorocarbons (CFCs) and highly fluorinated and/or perfluorinated hydrocarbons generally known from polyurethane chemistry. According to the invention, it is also possible to use, in particular, aliphatic and/or cycloaliphatic hydrocarbons, in particular pentane and cyclopentane, or acetals such as methylal and $CO_2$ as blowing agents. These physical blowing agents are usually added to the polyol component. However, they can also be added to the isocyanate component or, as a combination, both to the polyol component and to the isocyanate component.

It is also possible to use a plurality of blowing agents together, in particular in the form of an emulsion of the polyol component. If emulsifiers are employed, the emulsifiers used are usually oligomeric acrylates which comprise polyoxyalkylene and fluoroalkane radicals bound as side groups and have a fluorine content of from about 5 to 30% by weight. Such products are adequately known from plastics chemistry and are disclosed, for example, in EP 0 351 614 A. The amount of blowing agent or blowing agent mixture used is from 1 to 25% by weight, preferably from 1 to 15% by weight, in each case based on the total weight of the components used.

Furthermore, it is possible and customary to add from 0.5 to 15% by weight, preferably from 1 to 5% by weight, based on the total weight of the components used, of water as blowing agent to the polyol component. The addition of water can be combined with the use of the other blowing agents described.

For the purposes of the invention, preference is given to using water as blowing agent.

Catalysts used for producing the polyurethanes are, in particular, compounds which strongly accelerate the reaction of the reactive hydrogen atoms, in particular hydroxyl-comprising compounds, with the organic, if appropriate modified polyisocyanates. Possible catalysts are organic metal compounds, preferably organic tin compounds such as the tin(II) salts of organic carboxylic acids, e.g. tin(II) acetate, tin(II) octoate, tin(II) ethylhexanoate and tin(II) laurate, and the dialkyltin(IV) salts of organic carboxylic acids.

Suitable compounds of this type are, for example, dibutyltin diacetate, dibutyltin dilaurate, dibutyltin maleate and dioctyltin diacetate. The organic metal compounds are used either alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexyl-morpholine, N,N,N',N'-tetramethylethylenediamine, N,N,N',N'-tetramethylbutanediamine, N,N,N',N'-tetramethylhexane-1,6-diamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo-[2.2.2]octane, and aminoalkanol compounds such as triethanolamine, triisopropanolamine, N-methyldiethanolamine and N-ethyldiethanolamine and dimethylethanolamine.

Further possible catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide, and alkali metal alkoxides such as sodium methoxide and potassium isopropoxide, and also alkali metal salts of long-chain fatty acids having from 10 to 20 carbon atoms and, if appropriate, lateral OH groups.

Preference is given to using from 0.001 to 5% by weight, in particular from 0.05 to 2% by weight, of catalyst or catalyst combination, based on the weight of the formative components.

If appropriate, further auxiliaries and/or additives can be added to the reaction mixture for the production according to the invention of polyurethanes. Examples which may be mentioned are flame retardants, stabilizers, fillers, dyes, pigments and hydrolysis inhibitors and also fungistatic and bacteriostatic substances.

Suitable flame retardants are, for example, tricresyl phosphate, tris(2-chloroethyl)phosphate, tris(2-chloropropyl) phosphate, tetrakis(2-chloroethyl)ethylenediphosphate, dimethyl methanephosphonate, diethyl diethanolaminomethylphosphonate and also commercial halogen-comprising and halogen-free flame retardants. Apart from the abovementioned halogen-substituted phosphates, it is also possible to use inorganic or organic flame retardants such as red phosphorus, aluminum oxide hydrate, antimony trioxide, arsenic oxide, ammonium polyphosphate and calcium sulfate, expandable graphite or cyanuric acid derivatives such as melamine or mixtures of at least two flame retardants such as ammonium polyphosphates and melamine and also, if appropriate, maize starch or ammonium polyphosphate, melamine and expandable graphite and/or optionally aromatic polyesters for making the polyisocyanate polyaddition products flame resistant. Additions of melamine are found to be particularly effective. In general, it has been found to be advantageous to use from 5 to 50% by weight, preferably from 5 to 30% by weight, of the flame retardants mentioned per 100% by weight of the other components used.

Stabilizers used are, in particular, surface-active substances, i.e. compounds which serve to aid the homogenization of the starting materials and, if appropriate, are also suitable for regulating the cell structure of the polyurethane. Mention may be made by way of example of emulsifiers such as sodium salts of castor oil sulfates or fatty acids and amine salts of fatty acids, e.g. diethylamine oleate, diethanolamine stearate, diethanolamine ricinoleate, salts of sulfonic acids, e.g. alkali metal or ammonium salts of dodecylbenzenedisulfonic or dinaphthylmethanedisulfonic acid and ricinoleic acid; foam stabilizers such as siloxane-oxalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. Stabilizers employed are predominantly organopolysiloxanes which are soluble in water. These are polydimethylsiloxane radicals onto which a polyether chain comprising ethylene oxide and propylene oxide is grafted. The surface-active substances are usually used in amounts of from 0.01 to 5% by weight, based on 100% by weight of the other components used.

For the purposes of the present invention, fillers, in particular reinforcing fillers, are the known and customary organic and inorganic fillers, reinforcing materials, weighting agents, agents for improving the abrasion behavior in paints, coating compositions, etc. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may, if appropriate, also be coated with a size. Possible organic fillers are, for example: carbon, rosin, cyclopentadienyl resins and graft polymers and also cellulose fibers, polyimide, polyacrylonitrile, polyurethane, polyester fibers based on aromatic and/or aliphatic dicarboxylic esters and in particular carbon fibers. The inorganic and organic fillers can be used individually or as mixtures and are advantageously added to the reaction mixture in amounts of from 0.5 to 50% by weight, preferably from 1 to 40% by weight, based on the weight of the other components used, but the content of mats, nonwovens and woven fabrics composed of natural and synthetic fibers can reach values up to 80% by weight.

Further details regarding the abovementioned other customary auxiliaries and additives may be found in the technical literature, for example the monograph by J. H. Saunders and K. C. Frisch "High Polymers" volume XVI, "Polyurethanes", parts 1 and 2, Interscience Publishers 1962 and 1964, or the above-cited Kunststoffhandbuch, "Polyurethane", volume VII, Hanser-Verlag, Munich, Vienna, 1st to 3rd edition.

To produce the polyurethanes according to the invention, the organic and/or modified organic polyisocyanates, the polyol dispersion and, if appropriate, the further compounds having hydrogen atoms which are reactive toward isocyanates and also further constituents are reacted in such amounts that the equivalence ratio of NCO groups of the polyisocyanates to the sum of the reactive hydrogen atoms of the other components is less than 0.95:1, preferably less than 0.70:1.

Polyurethane foams can be produced, for example, by the one-shot process, for example by means of the high-pressure or low-pressure technique, in open or closed molds, for example metallic molds. Continuous application of the reaction mixture to suitable conveyor belts or discontinuous introduction into open block molds for producing slabstock foams are also customary.

Molded foams can also be produced by the two-component process.

Slabstock foams are usually produced by the multicomponent process. The reaction products are, in the case of slabstock foams, combined in a mixing head and applied directly or via a trough to the open foaming strip.

The temperatures here are preferably in the range from 20 to 25° C.

The starting components are mixed at a temperature of from 15 to 90° C., preferably from 20 to 60° C. and in particular from 20 to 35° C., and introduced into the open mold or, if appropriate under superatmospheric pressure, into the closed mold or applied in a continuous workstation to a belt which accommodates the reaction composition. Mixing can be carried out mechanically by means of a stirrer, by means of a stirring screw or by means of high-pressure mixing in a nozzle. The mold temperature is advantageously from 20 to 110° C., preferably from 30 to 60° C. and in particular from 35 to 55° C.

The polyurethane foams advantageously have a density of from 10 to 150 kg/m$^3$, preferably from 40 to 60 kg/m$^3$ in the case of molded foams and preferably from 14 to 100 kg/m$^3$ and in particular from 20 to 80 kg/m$^3$ in the case of slabstock foams. The compressive strengths are then in the range from 1 to 20 kPa, preferably from 1.5 to 12 kPa.

The polyol dispersions of the invention display good flow behavior under high shear stress and are therefore particularly suitable for producing polyurethane foams. As a result, the filtration rate in purification of the polyol dispersion after production is increased or a smaller filter area is required for the same throughputs.

Furthermore, they display a good storage stability and very good processing properties in the further processing to polyurethane end products. In the case of foam shapes having complicated geometries (automobile carpet backing, automobile seats, etc.), the reaction mixture flows well which leads to a reduction in formation of voids.

Owing to the improved cell opening behavior when the polyol dispersions of the invention are used, the use of cell-opening polyols and other processing aids can be restricted, for example in high-resilience foam formulations, which makes the formulation cheaper, eliminates a possible source of metering errors and improves the foam properties. Particular mention may be made of, for example, improved elongations at break and tear propagation resistances in the case of molded foams or improved values for tensile strength, elongation and compression set in the case of conventional slabstock foams having increased load-bearing capability.

EXAMPLES

Example 1

As copolymers (C) of the invention, the following copolymers 1 to 18 are obtained by free-radical addition polymerization. Table 1 gives the fractions of the individual monomers in the copolymers in % by weight:

TABLE 1

| No. | Stearyl acrylate [wt. %] | Styrene [wt. %] | Butyl acrylate [wt. %] | Acrylonitrile [wt. %] | Polyetherol macromer [wt. %] | $M_w$ [g/mol] |
|---|---|---|---|---|---|---|
| 1 | 44.44 | 44.44 | — | — | 11.12 | 18 100 |
| 2 | 88.88 | — | — | — | 11.12 | 9600 |
| 3 | 33.33 | 33.33 | — | — | 33.33 | 19 200 |
| 4 | 33.33 | 33.33 | — | — | 33.33 | 9300 |
| 5 | 50.00 | — | — | — | 50.00 | 14 900 |
| 6 | 33.33 | — | 33.33 | — | 33.33 | 13 900 |
| 7 | 33.33 | — | 33.33 | — | 33.33 | 9400 |
| 8 | 50.00 | — | — | — | 50.00 | 11 800 |
| 9 | 33.33 | — | 33.33 | — | 33.33 | 3800 |
| 10 | 33.33 | — | 33.33 | — | 33.33 | 45 800 |
| 11 | 33.33 | — | 33.33 | — | 33.33 | 10 700 |
| 12 | 33.33 | — | 33.33 | — | 33.33 | 13 100 |
| 13 | 50.00 | — | — | — | 50.00 | 12 600 |
| 14 | 16.53 | 33.33 | — | — | 49.53 | 30 000 |
| 15 | 20.33 | 20.33 | — | — | 59.33 | 68 800 |
| 16 | 30.33 | — | — | — | 69.67 | 38 100 |
| 17 | 15.33 | 15.33 | — | — | 59.33 | 10 000 |
| 18 | 33.33 | — | — | 33.33 | 33.33 | — |

The molecular weight is determined via GPC with polystyrene standard.

Polyol dispersions of the invention are prepared with the copolymers (C).

1) The dispersion ingredients are charged to a stirred vessel at ambient temperature. If the charging of the vessel at ambient temperature is not possible on account of high viscosity, the reactants are preheated.
2) If the dispersion ingredients are not already introduced at this temperature, the mixture of components is heated with stirring to 130° C. or to a temperature which is higher than the melting temperature of the disperse phase.
3) The mixture is homogenized via a toothed-ring dispersing machine or by ultrasound.
4) The homogenizer is removed and the material is transferred to a collecting vessel and cooled to room temperature.

The compositions of the individual polyol dispersions are set out in table 2.

The particle size distributions are measured using a Malvern Mastersizer. The individual figures have the following significations:
 d10: 10% of the total volume of the particles have a diameter which is smaller than the stated value
 d50: 50% of the total volume of the particles have a diameter which is smaller than the stated value
 d90: 90% of the total volume of the particles have a diameter which is smaller than the stated value.

TABLE 2

| No. | Copolymer (from table 1) [g] 4 | 6 | 7 | 8 | 9 | 10 | 11 | 14 | 15 | 16 | Polymer (P) [g] | Polyol [g] | PSD Malvern d10 | d50 | d90 |
|---|---|---|---|---|---|---|---|---|---|---|---|---|---|---|---|
| 2.1 | 0.34 | — | — | — | — | — | — | — | — | — | 3.375 | 11.285 | 2.36 | 20.72 | 59.85 |
| 2.2 | — | 0.34 | — | — | — | — | — | — | — | — | 3.375 | 10.875 | 3.45 | 55.921 | 178.90 |
| 2.3 | — | 0.75 | — | — | — | — | — | — | — | — | 3.375 | 11.285 | 3.75 | 65.90 | 172.47 |
| 2.4 | — | — | 0.34 | — | — | — | — | — | — | — | 3.375 | 10.875 | 4.87 | 116.43 | 467.35 |
| 2.5 | — | — | 0.75 | — | — | — | — | — | — | — | 3.375 | 11.285 | 4.19 | 119.07 | 329.71 |
| 2.6 | — | — | — | 0.34 | — | — | — | — | — | — | 3.375 | 10.875 | 3.86 | 103.79 | 351.03 |
| 2.7 | — | — | — | 0.75 | — | — | — | — | — | — | 3.375 | 11.285 | 3.79 | 107.98 | 329.63 |
| 2.8 | — | — | — | — | 0.34 | — | — | — | — | — | 3.375 | 10.875 | 2.31 | 47.86 | 164.31 |
| 2.9 | — | — | — | — | 0.75 | — | — | — | — | — | 3.375 | 11.285 | 1.88 | 28.28 | 79.70 |
| 2.10 | — | — | — | — | — | 0.34 | — | — | — | — | 3.375 | 10.875 | 1.18 | 6.46 | 31.06 |
| 2.11 | — | — | — | — | — | — | 0.34 | — | — | — | 3.375 | 11.285 | 2.85 | 68.47 | 173.69 |
| 2.12 | — | — | — | — | — | — | 0.75 | — | — | — | 3.375 | 10.875 | 4.21 | 75.62 | 203.97 |
| 2.13 | — | — | — | — | — | — | — | 0.34 | — | — | 3.375 | 11.285 | 1.14 | 4.81 | 50.92 |
| 2.14 | — | — | — | — | — | — | — | 0.75 | — | — | 3.375 | 10.875 | 1.03 | 2.24 | 7.90 |
| 2.15 | — | — | — | — | — | — | — | — | 0.34 | — | 3.375 | 11.285 | 1.44 | 10.03 | 22.07 |
| 2.16 | — | — | — | — | — | — | — | — | 0.75 | — | 3.375 | 10.875 | 1.14 | 3.29 | 9.55 |
| 2.17 | — | — | — | — | — | — | — | — | — | 0.34 | 3.375 | 11.275 | 1.18 | 4.52 | 32.81 |

Tables 3 and 4 show polyol dispersions of the invention which additionally comprise an emulsifier.

TABLE 3

| No. | \multicolumn{12}{c}{Copolymer (C) (from table 1) [g]} | T-Maz 85 [g] | Polymer (P) [g] | Polyol [g] | \multicolumn{3}{c}{PSD Malvern} |
|---|---|---|---|---|---|---|---|---|---|---|---|---|---|---|---|---|---|

| No. | 2 | 3 | 4 | 5 | 6 | 7 | 8 | 9 | 10 | 14 | 15 | 16 | T-Maz 85 [g] | Polymer (P) [g] | Polyol [g] | d10 | d50 | d90 |
|---|---|---|---|---|---|---|---|---|---|---|---|---|---|---|---|---|---|---|
| 3.1 | 0.07 | — | — | — | — | — | — | — | — | — | — | — | 0.27 | 3.375 | 11.285 | 1.91 | 38.41 | 213.94 |
| 3.2 | — | 0.07 | — | — | — | — | — | — | — | — | — | — | 0.27 | 3.375 | 11.285 | 2.18 | 49.07 | 216.64 |
| 3.3 | — | — | 0.07 | — | — | — | — | — | — | — | — | — | 0.27 | 3.375 | 11.285 | 3.57 | 68.87 | 131.11 |
| 3.4 | — | — | 0.27 | — | — | — | — | — | — | — | — | — | 0.07 | 3.375 | 11.285 | 2.85 | 28.41 | 79.85 |
| 3.5 | — | — | — | 0.07 | — | — | — | — | — | — | — | — | 0.27 | 3.375 | 11.285 | 2.97 | 59.53 | 214.12 |
| 3.6 | — | — | — | 0.17 | — | — | — | — | — | — | — | — | 0.17 | 3.375 | 11.285 | 2.90 | 80.22 | 215.89 |
| 3.7 | — | — | — | — | 0.07 | — | — | — | — | — | — | — | 0.27 | 3.375 | 11.285 | 4.77 | 77.87 | 193.56 |
| 3.8 | — | — | — | — | 0.27 | — | — | — | — | — | — | — | 0.07 | 3.375 | 11.285 | 4.92 | 94.65 | 226.48 |
| 3.9 | — | — | — | — | — | 0.07 | — | — | — | — | — | — | 0.27 | 3.375 | 11.285 | 3.35 | 87.43 | 283.70 |
| 3.10 | — | — | — | — | — | 0.17 | — | — | — | — | — | — | 0.17 | 3.375 | 11.285 | 4.91 | 112.48 | 316.70 |
| 3.11 | — | — | — | — | — | 0.27 | — | — | — | — | — | — | 0.07 | 3.375 | 11.285 | 5.80 | 126.18 | 370.47 |
| 3.12 | — | — | — | — | — | — | 0.07 | — | — | — | — | — | 0.27 | 3.375 | 11.285 | 3.86 | 84.52 | 245.34 |
| 3.13 | — | — | — | — | — | — | 0.17 | — | — | — | — | — | 0.17 | 3.375 | 11.285 | 4.94 | 92.34 | 246.53 |
| 3.14 | — | — | — | — | — | — | 0.27 | — | — | — | — | — | 0.07 | 3.375 | 11.285 | 5.26 | 120.62 | 463.08 |
| 3.15 | — | — | — | — | — | — | — | 0.07 | — | — | — | — | 0.27 | 3.375 | 11.285 | 3.25 | 84.36 | 193.82 |
| 3.16 | — | — | — | — | — | — | — | 0.17 | — | — | — | — | 0.17 | 3.375 | 11.285 | 2.37 | 58.70 | 137.47 |
| 3.17 | — | — | — | — | — | — | — | 0.27 | — | — | — | — | 0.07 | 3.375 | 11.285 | 2.06 | 45.15 | 104.02 |
| 3.18 | — | — | — | — | — | — | — | — | 0.07 | — | — | — | 0.27 | 3.375 | 11.285 | 2.24 | 43.77 | 93.86 |
| 3.19 | — | — | — | — | — | — | — | — | 0.17 | — | — | — | 0.17 | 3.375 | 11.285 | 1.74 | 25.91 | 59.41 |
| 3.20 | — | — | — | — | — | — | — | — | 0.27 | — | — | — | 0.07 | 3.375 | 11.285 | 1.32 | 13.27 | 47.36 |
| 3.21 | — | — | — | — | — | — | — | — | — | 0.07 | — | — | 0.27 | 3.375 | 11.285 | 3.17 | 99.17 | 209.36 |
| 3.22 | — | — | — | — | — | — | — | — | — | 0.17 | — | — | 0.17 | 3.375 | 11.285 | 1.91 | 13.32 | 106.76 |
| 3.23 | — | — | — | — | — | — | — | — | — | 0.27 | — | — | 0.07 | 3.375 | 11.285 | 1.30 | 8.62 | 19.35 |
| 3.24 | — | — | — | — | — | — | — | — | — | — | 0.07 | — | 0.27 | 3.375 | 11.285 | 2.24 | 47.76 | 100.73 |
| 3.25 | — | — | — | — | — | — | — | — | — | — | 0.17 | — | 0.17 | 3.375 | 11.285 | 2.19 | 25.37 | 65.22 |
| 3.26 | — | — | — | — | — | — | — | — | — | — | 0.27 | — | 0.07 | 3.375 | 11.285 | 1.70 | 13.31 | 26.67 |
| 3.27 | — | — | — | — | — | — | — | — | — | — | — | 0.07 | 0.27 | 3.375 | 11.285 | 1.69 | 23.26 | 59.50 |
| 3.28 | — | — | — | — | — | — | — | — | — | — | — | 0.17 | 0.17 | 3.375 | 11.285 | 1.22 | 9.62 | 38.78 |
| 3.29 | — | — | — | — | — | — | — | — | — | — | — | 0.27 | 0.27 | 3.375 | 11.285 | 1.16 | 3.61 | 22.57 |

TABLE 4

| No. | \multicolumn{12}{c}{Copolymer (C) (from table 1) [g]} |
|---|---|---|---|---|---|---|---|---|---|---|---|---|

| No. | 2 | 3 | 4 | 5 | 6 | 7 | 8 | 9 | 10 | 11 | 14 | 15 | 16 |
|---|---|---|---|---|---|---|---|---|---|---|---|---|---|
| 4.1 | 0.07 | — | — | — | — | — | — | — | — | — | — | — | — |
| 4.2 | — | 0.07 | — | — | — | — | — | — | — | — | — | — | — |
| 4.3 | — | 0.17 | — | — | — | — | — | — | — | — | — | — | — |
| 4.4 | — | 0.27 | — | — | — | — | — | — | — | — | — | — | — |
| 4.5 | — | — | 0.07 | — | — | — | — | — | — | — | — | — | — |
| 4.6 | — | — | 0.17 | — | — | — | — | — | — | — | — | — | — |
| 4.7 | — | — | 0.27 | — | — | — | — | — | — | — | — | — | — |
| 4.8 | — | — | — | 0.07 | — | — | — | — | — | — | — | — | — |
| 4.9 | — | — | — | 0.17 | — | — | — | — | — | — | — | — | — |
| 4.10 | — | — | — | — | 0.07 | — | — | — | — | — | — | — | — |
| 4.11 | — | — | — | — | 0.17 | — | — | — | — | — | — | — | — |
| 4.12 | — | — | — | — | 0.27 | — | — | — | — | — | — | — | — |
| 4.13 | — | — | — | — | — | 0.07 | — | — | — | — | — | — | — |
| 4.14 | — | — | — | — | — | 0.17 | — | — | — | — | — | — | — |
| 4.15 | — | — | — | — | — | 0.27 | — | — | — | — | — | — | — |
| 4.16 | — | — | — | — | — | — | 0.07 | — | — | — | — | — | — |
| 4.17 | — | — | — | — | — | — | 0.17 | — | — | — | — | — | — |
| 4.18 | — | — | — | — | — | — | 0.27 | — | — | — | — | — | — |
| 4.19 | — | — | — | — | — | — | — | 0.07 | — | — | — | — | — |
| 4.20 | — | — | — | — | — | — | — | 0.17 | — | — | — | — | — |
| 4.21 | — | — | — | — | — | — | — | 0.27 | — | — | — | — | — |
| 4.22 | — | — | — | — | — | — | — | — | 0.07 | — | — | — | — |
| 4.23 | — | — | — | — | — | — | — | — | 0.17 | — | — | — | — |
| 4.24 | — | — | — | — | — | — | — | — | 0.27 | — | — | — | — |
| 4.25 | — | — | — | — | — | — | — | — | — | 0.07 | — | — | — |
| 4.26 | — | — | — | — | — | — | — | — | — | 0.17 | — | — | — |
| 4.27 | — | — | — | — | — | — | — | — | — | 0.27 | — | — | — |
| 4.28 | — | — | — | — | — | — | — | — | — | — | 0.07 | — | — |
| 4.29 | — | — | — | — | — | — | — | — | — | — | 0.17 | — | — |
| 4.30 | — | — | — | — | — | — | — | — | — | — | 0.27 | — | — |
| 4.31 | — | — | — | — | — | — | — | — | — | — | — | 0.07 | — |
| 4.32 | — | — | — | — | — | — | — | — | — | — | — | 0.17 | — |

TABLE 4-continued

| | | | | | | | | | | | | |
|---|---|---|---|---|---|---|---|---|---|---|---|---|
| 4.33 | — | — | — | — | — | — | — | — | — | — | 0.17 | — |
| 4.34 | — | — | — | — | — | — | — | — | — | — | 0.17 | 0.07 |
| 4.35 | — | — | — | — | — | — | — | — | — | — | 0.17 | 0.17 |
| 4.36 | — | — | — | — | — | — | — | — | — | — | 0.27 | 0.27 |

| No. | Mazol PGO31K [g] | Polymer (P) [g] | Polyol [g] | PSD Malvern d10 | d50 | d90 |
|---|---|---|---|---|---|---|
| 4.1 | 0.27 | 3.375 | 11.285 | 1.27 | 6.36 | 29.74 |
| 4.2 | 0.27 | 3.375 | 11.285 | 1.35 | 9.31 | 37.67 |
| 4.3 | 0.17 | 3.375 | 11.285 | 1.47 | 15.54 | 59.51 |
| 4.4 | 0.07 | 3.375 | 11.285 | 8.04 | 142.74 | 580.12 |
| 4.5 | 0.27 | 3.375 | 11.285 | 1.67 | 15.22 | 98.43 |
| 4.6 | 0.17 | 3.375 | 11.285 | 1.48 | 23.44 | 67.56 |
| 4.7 | 0.07 | 3.375 | 11.285 | 2.11 | 23.98 | 58.31 |
| 4.8 | 0.27 | 3.375 | 11.285 | 1.19 | 8.90 | 31.59 |
| 4.9 | 0.17 | 3.375 | 11.285 | 1.32 | 10.36 | 37.67 |
| 4.10 | 0.27 | 3.375 | 11.285 | 1.23 | 8.80 | 33.19 |
| 4.11 | 0.17 | 3.375 | 11.285 | 1.39 | 11.49 | 39.73 |
| 4.12 | 0.07 | 3.375 | 11.285 | 2.33 | 37.98 | 127.41 |
| 4.13 | 0.27 | 3.375 | 11.285 | 1.45 | 15.75 | 68.73 |
| 4.14 | 0.17 | 3.375 | 11.285 | 1.37 | 14.15 | 53.02 |
| 4.15 | 0.07 | 3.375 | 11.285 | 1.67 | 31.47 | 138.65 |
| 4.16 | 0.27 | 3.375 | 11.285 | 1.33 | 11.93 | 47.27 |
| 4.17 | 0.17 | 3.375 | 11.285 | 1.45 | 16.35 | 893.18 |
| 4.18 | 0.07 | 3.375 | 11.285 | 1.85 | 39.14 | 177.29 |
| 4.19 | 0.27 | 3.375 | 11.285 | 1.51 | 14.36 | 683.76 |
| 4.20 | 0.17 | 3.375 | 11.285 | 1.47 | 15.99 | 639.76 |
| 4.21 | 0.07 | 3.375 | 11.285 | 2.32 | 45.69 | 924.51 |
| 4.22 | 0.27 | 3.375 | 11.285 | 1.16 | 7.43 | 23.95 |
| 4.23 | 0.17 | 3.375 | 11.285 | 1.12 | 6.55 | 20.94 |
| 4.24 | 0.07 | 3.375 | 11.285 | 1.20 | 7.09 | 31.14 |
| 4.25 | 0.27 | 3.375 | 11.285 | 1.29 | 11.10 | 43.95 |
| 4.26 | 0.17 | 3.375 | 11.285 | 1.39 | 14.94 | 48.29 |
| 4.27 | 0.07 | 3.375 | 11.285 | 1.61 | 23.16 | 73.05 |
| 4.28 | 0.27 | 3.375 | 11.285 | 1.34 | 10.95 | 52.47 |
| 4.29 | 0.17 | 3.375 | 11.285 | 1.39 | 8.87 | 27.83 |
| 4.30 | 0.07 | 3.375 | 11.285 | 1.32 | 8.76 | 20.81 |
| 4.31 | 0.27 | 3.375 | 11.285 | 1.33 | 9.55 | 43.00 |
| 4.32 | 0.17 | 3.375 | 11.285 | 1.16 | 7.46 | 27.82 |
| 4.33 | 0.07 | 3.375 | 11.285 | 1.56 | 11.75 | 24.82 |
| 4.34 | 0.27 | 3.375 | 11.285 | 1.19 | 6.93 | 18.33 |
| 4.35 | 0.17 | 3.375 | 11.285 | 1.08 | 4.49 | 11.16 |
| 4.36 | 0.07 | 3.375 | 11.285 | 1.22 | 5.55 | 35.02 |

The thermoplastic polymer (P) present is a low molecular mass polyethylene. The polyol used is a polyether polyol formed from glycerol, propylene oxide, and ethylene oxide.

The additional emulsifiers (tables 3 and 4) are on the one hand Mazol PGO 31 K, a trigylcerol monooleate, and on the other hand T-Maz 85, a polysorbitol trisoctadecanoate.

Example 2

Preparation of a Dispersion of the Invention by Process (V')

1) The dispersion ingredients are charged to a stirred vessel at arbitrary temperature/in arbitrary aggregate state. If initial introduction at ambient temperature is not possible on account of high viscosity, the reactants are preheated.
2) If the dispersion ingredients are not already introduced at this temperature, the mixture of components is heated with stirring to 150° C. or to a temperature which is higher than the melting temperature of the disperse phase.
3) The mixture is circulated for five theoretical passages via the emulsifying machine (toothed ring dispersing machine, peripheral speed about 20 m/s), the system as a whole being at a conditioned temperature of 150° C.
4) Circulation mode is switched off, and the material is discharged from the initial-charge vessel via the temperature-conditioned (150° C.) toothed ring dispersing machine at a flow rate of 1.2 kg/h+/−20%, via a double tube cooler with a cooling area of 0.04 m², at a cooling rate of 60 K/min. The temperature of the cooling medium is 15° C. and the temperature of the product on exit from the cooler is 25° C.

Mastersizer (Measurement of the Particle Size Distribution):

Mastersizer 2000 (principle of static light scattering); samples are diluted with isopropanol to the concentration necessary for the measurement.

The invention claimed is:

1. A dispersion, comprising:
(i) at least one liquid polymer, which is a liquid at 25° C. and 1013 mbar and selected from the group consisting of a polyol, a polymeric isocyanate, a polyacrylate, a film-forming polymer, a polyurethane prepolymer, and polyisobutene; and
(ii) at least one polymer particle mixture comprising
(a) at least one thermoplastic polymer (P) selected from the group consisting of a polystyrene, a poly(styrene-co-acrylonitrile), a polyacrylate, a polymethacrylate, a polyolefin, a polyester, a polyamide, a thermoplastic polyurethane, and a copolymer comprising at least two monomers selected from the group consisting of styrene, an acrylate, a methacrylate, an olefin, a polyester monomer, and a polyamide monomer, and (b) at least one random copolymer (C) synthesized from at least one α,β-ethylenically unsaturated monomer and at least one polymerizable liquid polymer selected from the group consisting of:

a polyol obtained from at least one unsaturated starter alcohol selected from the group consisting of an allylalcohol, isoprenol, and hydroxybutylvinylether, or at least one hydroxyalkyl(meth)acrylate;

a polyol obtained by reaction of a polyol with an unsaturated acid, which is (meth)acrylic acid;

a polyol obtained by reaction of a polyol with an unsaturated ester, which is a (meth)acrylic acid ester;

a polyol obtained by reaction of a polyol with an unsaturated isocyanate;

a polymeric isocyanate obtained by reaction of an NCO-terminated polymeric isocyanate with a hydroxylalkylacrylate;

a polymeric isocyanate obtained by reaction of an NCO-terminated polymeric isocyanate with a hydroxylalkylmethacrylate;

a polyurethane-prepolymer obtained by reaction of an NCO-terminated polyurethane prepolymer with a hydroxylalkylacrylate;

a polyurethane-prepolymer obtained by reaction of an NCO-terminated polyurethane prepolymer with a hydroxylalkylmethacrylate;

a poly(meth)acrylate obtained by reaction of a poly(meth)acrylate with an unsaturated alcohol; and a polyisobutene obtained by reaction polyisobutene-succinic acid-anhydride with an unsaturated alcohol.

2. The dispersion according to claim 1, wherein the polyol is present and is at least one selected from the group consisting of a polyetherol, and a polyesterol.

3. The dispersion according to claim 1, further comprising at least one emulsifier.

4. A process for preparing a dispersion according claim 1, the process comprising:

(A) heating a first mixture (I) comprising at least one thermoplastic polymer (P) selected from the group consisting of a polystyrene, a poly(styrene-co-acrylonitrile), a polyacrylate, a polymethacrylate, a polyolefin, a polyester, a polyamide, a thermoplastic polyurethane, and a copolymer comprising at least two monomers selected from the group consisting of styrene, a styrene, an acrylate, a methacrylate, an olefin, a polyester monomer, and a polyamide monomer, at least one liquid polymer, which is a liquid at 25° C. and 1013 mbar and selected from the group consisting of a polyol, a polymeric isocyanate, a polyacrylate, a film-forming polymer, a polyurethane prepolymer, and polyisobutene, and at least one random copolymer (C) synthesized from at least one α,β-ethylenically unsaturated monomer and at least one polymerizable liquid polymer selected from the group consisting of:

a polyol obtained from at least one unsaturated starter alcohol selected from the group consisting of an allylalcohol, isoprenol, and hydroxybutylvinylether, or at least one hydroxyalkyl(meth)acrylate;

a polyol obtained by reaction of a polyol with an unsaturated acid, which is (meth)acrylic acid;

a polyol obtained by reaction of a polyol with an unsaturated ester, which is a (meth)acrylic acid ester;

a polyol obtained by reaction of a polyol with an unsaturated isocyanate;

a polymeric isocyanate obtained by reaction of an NCO-terminated polymeric isocyanate with a hydroxylalkylacrylate;

a polymeric isocyanate obtained by reaction of an NCO-terminated polymeric isocyanate with a hydroxylalkylmethacrylate;

a polyurethane-prepolymer obtained by reaction of an NCO-terminated polyurethane prepolymer with a hydroxylalkylacrylate;

a polyurethane-prepolymer obtained by reaction of an NCO-terminated polyurethane prepolymer with a hydroxylalkylmethacrylate;

a poly(meth)acrylate obtained by reaction of a poly(meth)acrylate with an unsaturated alcohol; and a polyisobutene obtained by reaction polyisobutene-succinic acid-anhydride with an unsaturated alcohol, to give a second mixture (II); and (C) cooling the second mixture (II).

5. The process according to claim 4, further comprising after (A), and prior to (C):

(B) dispersing the second mixture (II).

6. A process for preparing a dispersion, the process comprising:

(A') heating a first mixture (I') comprising at least one thermoplastic polymer (P) selected from the group consisting of a polystyrene, a poly(styrene-co-acrylonitrile), a polyacrylate, a polymethacrylate, a polyolefin, a polyester, a polyamide, a thermoplastic polyurethane, and a copolymer comprising at least two monomers selected from the group consisting of styrene, a styrene, an acrylate, a methacrylate, an olefin, a polyester monomer, and a polyamide monomer, at least one liquid polymer, which is a liquid at 25° C. and 1013 mbar and selected from the group consisting of a polyol, a polymeric isocyanate, a polyacrylate, a film-forming polymer, a polyurethane prepolymer, and polyisobutene, and at least one random copolymer (C') synthesized from at least one α,β-ethylenically unsaturated monomer and at least one polymerizable liquid polymer selected from the group consisting of:

a polyol obtained from at least one unsaturated starter alcohol selected from the group consisting of an allylalcohol, isoprenol, and hydroxybutylvinylether, or at least one hydroxyalkyl(meth)acrylate;

a polyol obtained by reaction of a polyol with an unsaturated acid, which is (meth)acrylic acid;

a polyol obtained by reaction of a polyol with an unsaturated ester, which is a (meth)acrylic acid ester;

a polyol obtained by reaction of a polyol with an unsaturated isocyanate;

a polymeric isocyanate obtained by reaction of an NCO-terminated polymeric isocyanate with a hydroxylalkylacrylate;

a polymeric isocyanate obtained by reaction of an NCO-terminated polymeric isocyanate with a hydroxylalkylmethacrylate;

a polyurethane-prepolymer obtained by reaction of an NCO-terminated polyurethane prepolymer with a hydroxylalkylacrylate;

a polyurethane-prepolymer obtained by reaction of an NCO-terminated polyurethane prepolymer with a hydroxylalkylmethacrylate;

a poly(meth)acrylate obtained by reaction of a poly(meth)acrylate with an unsaturated alcohol; and a polyisobutene obtained by reaction of polyisobutene-succinic acid-anhydride with an unsaturated alcohol, to give a second mixture (II');

(B) dispersing the second mixture (II'); and (C) cooling the second mixture (II) with a cooling rate of at least 10 K/min.

7. The process according to claim 4, wherein no shearing takes place in (C).

8. A dispersion obtained by the process according to claim 4.

9. An automobile, architectural or roof coating, a sealant, a cement, paper, a textile, leather, an adhesive, a fuel additive composition, comprising the dispersion according to claim 1.

10. A polyurethane, comprising the dispersion according to claim 1.

11. A process for preparing a polyurethane, the process comprising reacting the dispersion according to claim 1 with at least one polyisocyanate.

12. The dispersion according to claim 2, further comprising at least one emulsifier.

* * * * *